US012671646B1

(12) United States Patent
Dunsmore et al.

(10) Patent No.: US 12,671,646 B1
(45) Date of Patent: Jun. 30, 2026

(54) DYNAMIC INSERTION OF INTERMEDIATE NETWORK COMPONENTS

(71) Applicant: Amazon Technologies, Inc., Seattle, WA (US)

(72) Inventors: Devlin Roarke Dunsmore, Bothell, WA (US); Sandeep Bajaj, San Ramon, CA (US); Shridhar Kulkarni, Fremont, CA (US); Brandon Michael LaRue, Alexandria, VA (US); Baihu Qian, Chicago, IL (US); Bashuman Deb, Aldie, VA (US)

(73) Assignee: Amazon Technologies, Inc., Seattle, WA (US)

( * ) Notice: Subject to any disclaimer, the term of this patent is extended or adjusted under 35 U.S.C. 154(b) by 62 days.

(21) Appl. No.: 18/542,301

(22) Filed: Dec. 15, 2023

(51) Int. Cl.
| | |
|---|---|
| *H04L 45/02* | (2022.01) |
| *H04L 45/24* | (2022.01) |
| *H04L 9/40* | (2022.01) |

(52) U.S. Cl.
CPC .............. *H04L 45/02* (2013.01); *H04L 45/24* (2013.01); *H04L 63/20* (2013.01)

(58) Field of Classification Search
CPC ................................ H04L 45/02; H04L 45/24
See application file for complete search history.

(56) References Cited

U.S. PATENT DOCUMENTS

| | | | | |
|---|---|---|---|---|
| 10,944,647 | B2 * | 3/2021 | Tidemann ........... | G06F 9/45558 |
| 10,999,137 | B2 * | 5/2021 | Cidon ................. | H04L 41/0895 |
| 11,089,111 | B2 * | 8/2021 | Markuze ................ | H04L 69/30 |
| 11,240,156 | B2 * | 2/2022 | Fedorov ............. | H04L 67/1036 |
| 2010/0011244 | A1 * | 1/2010 | Mohamed-Rasheed ..................... H04L 45/04 709/241 |
| 2021/0135991 | A1 * | 5/2021 | Dickinson ........... | H04L 12/4633 |
| 2025/0016054 | A1 * | 1/2025 | Boulos ................ | H04L 41/5009 |

* cited by examiner

*Primary Examiner* — G. C. Neurauter, Jr.
(74) *Attorney, Agent, or Firm* — Knobbe, Martens, Olson & Bear, LLP

(57) ABSTRACT

Systems and methods are provided for automatic generation of routing through a user-specified network appliance. A wide area network (WAN) may include isolated network nodes, such as, VPCs, VPNs, or client-on-premises devices. The WAN may also include network appliances, such as firewalls or load balancers. To manage traffic between isolated network nodes, a management component of the WAN may access instructions including specified network appliances for inclusion in routes between isolated network nodes. Based on these instructions, the management component may then generate segments with routing information relating to steering traffic through the specified network appliances. The routing information may relate to steering traffic across region and/or segment boundaries within the WAN.

20 Claims, 7 Drawing Sheets

300

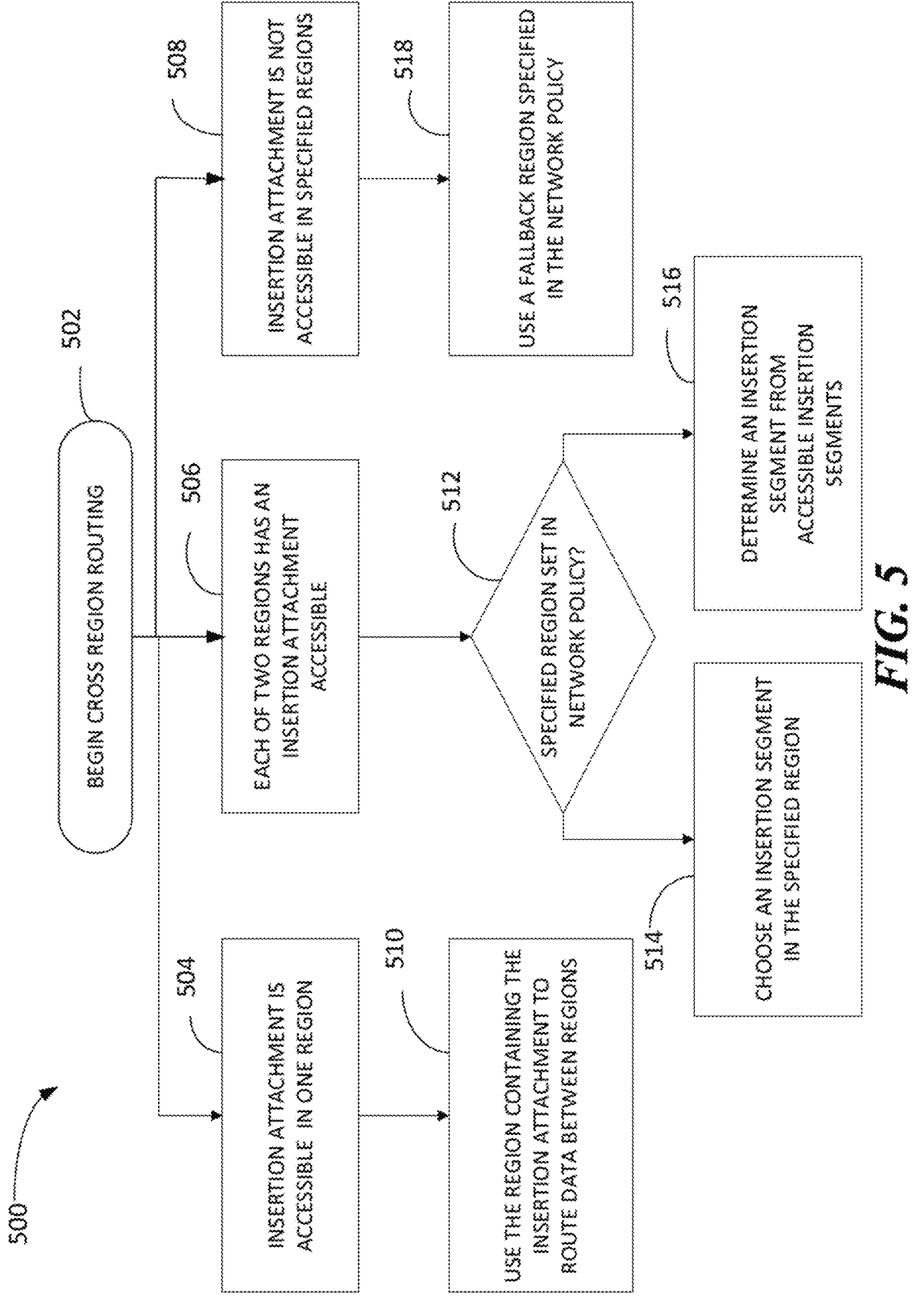

BEGIN CROSS REGION ROUTING
502

INSERTION ATTACHMENT IS ACCESSIBLE IN ONE REGION
504

INSERTION ATTACHMENT IS NOT ACCESSIBLE IN SPECIFIED REGIONS
508

EACH OF TWO REGIONS HAS AN INSERTION ATTACHMENT ACCESSIBLE
506

USE A FALLBACK REGION SPECIFIED IN THE NETWORK POLICY
518

USE THE REGION CONTAINING THE INSERTION ATTACHMENT TO ROUTE DATA BETWEEN REGIONS
510

SPECIFIED REGION SET IN NETWORK POLICY?
512

CHOOSE AN INSERTION SEGMENT IN THE SPECIFIED REGION
514

DETERMINE AN INSERTION SEGMENT FROM ACCESSIBLE INSERTION SEGMENTS
516

DYNAMIC INSERTION OF INTERMEDIATE NETWORK COMPONENTS

BACKGROUND

Generally described, computing devices can utilize communication networks to exchange data. Companies and organizations operate computer networks that interconnect a number of computing devices to support operations or provide services to third parties. The computing systems can be located in a single geographic location or public communication networks. Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf, or for the benefit of, the general public. To facilitate increase utilization of data center resources, virtualization technologies allow a single physical computing device to host one or more instances of virtual machines that appear and operate as independent computing devices to users of a data center.

Computing networks can be modeled as a series of nodes, which may represent computing devices and/or virtual machines, or other networks. Wide Area Networks (WANs) are, for example, generally made up of connection points and attachments, such as virtual private networks (VPNs) and virtual private clouds (VPCs). WANs can be considered as a collection of Local Area Networks (LANs) that are connected by a collection of physical communication channels. For example, a LAN may be leased lines from telecommunication companies. For communication through a network, packets of data are typically transmitted from an origin to an identified destination. Paths between an origin to an identified destination may be represented by routes including one or more nodes.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 5 is a flowchart of an example routine 500 for dynamic insertion of intermediate network components in cross region routes.

DETAILED DESCRIPTION

Figure 1:
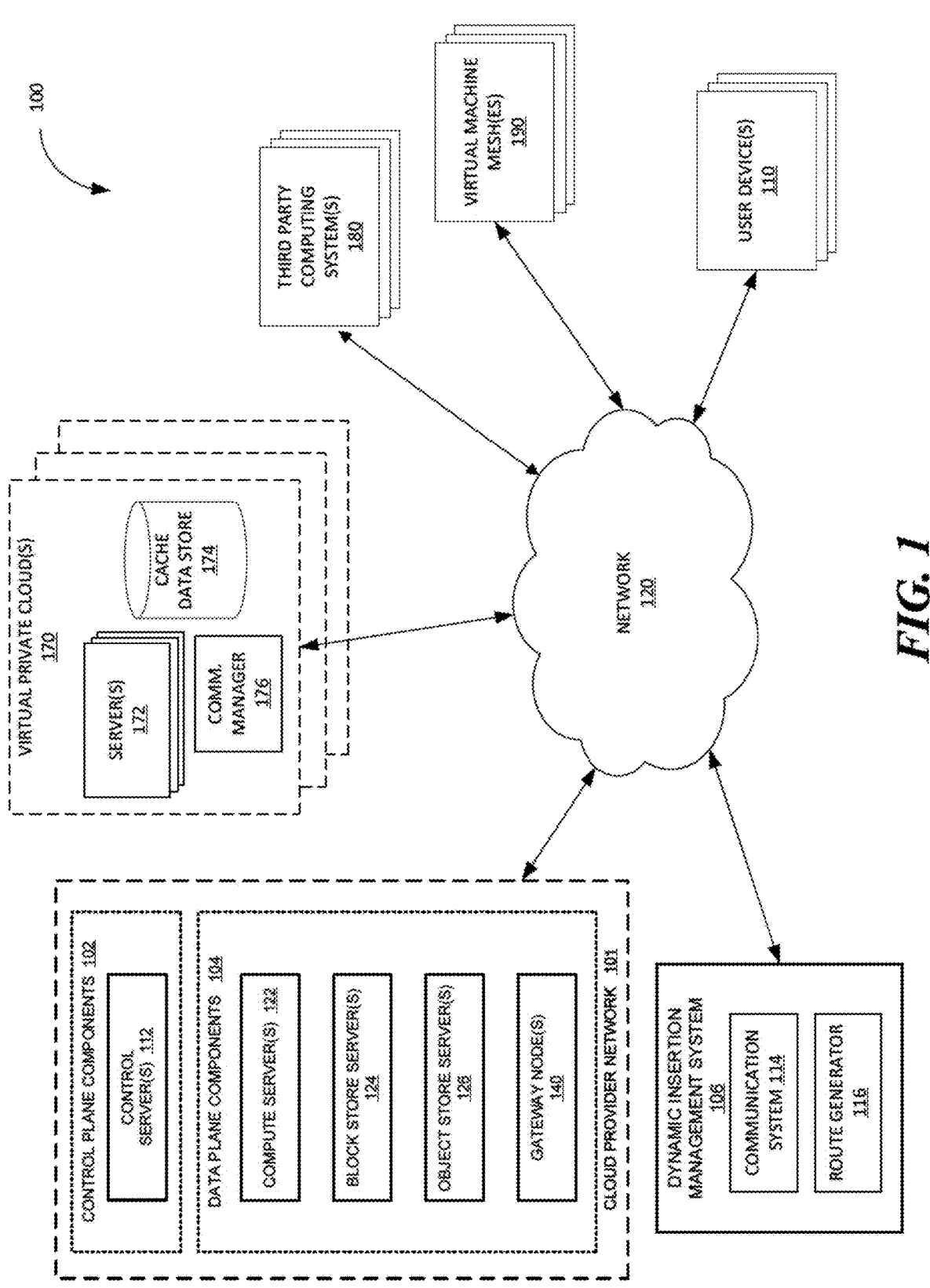
FIG. 1 illustrates an example computing environment in which dynamic insertion of intermediate network components may be implemented according to some embodiments.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Generally described, the present disclosure relates to systems and methods for dynamic insertion of intermediate network components. The system first obtains a formal specification of the current network policy of the network representing the rules and other configuration settings that are used to make network traffic routing decisions within the network environment as defined in the policy. The specification may include rules and other configuration settings for inclusion of an. intermediate component, such as a firewall, in routing within the network environment. Once the specification is received, the system may deploy the network based on the specification at least by generating route tables compliant with the specification.

In some embodiments, intermediate components may be network appliances. Network appliances may be computing resources which aid in the communication of data between other systems within a network. Network appliances may include, but are not limited to caches, firewalls (e.g., Next-Gen Firewall (NGFW)), Intrusion Detection/Prevention (IDS/IPS), authentication systems, Deep Packet Inspection, Uniform Resource Locator (URL) filtering, and address management (e.g., network address management). Additionally, or alternatively, intermediate components may include, but are not limited to, VPCs, VPNs, or LANs. Illustratively, VPCs may include network appliances. As another example, VPCs may include application-specific services for insertion in routing within the network environment.

In existing conventional systems, cloud-based network providers may offer clients access to shared, geographically-dispersed network infrastructure, such as a software-defined wide-area network ("SD-WAN"). The typical network infrastructure may include virtualized compute instances, distributed storage systems, local area networks (LANs), virtual private clouds (VPCs), and the like. The typical shared network infrastructure may be complex in terms of size, physical and logical separations, and similar considerations, which may increase difficulty in managing communications between resources included in the shared infrastructure. The typical network infrastructure also grow and change over time as network components (also referred to herein as "components" for brevity) are removed, replaced, and added.

In some systems, within the typical shared network infrastructure, conventional networking and interconnectivity-related features may be provided to meet the requirements of applications being implemented using services hosted in the infrastructure. For example, routers or other gateways in distinct regions may be peered to share routing data and provide end-to-end routing through the typical shared network infrastructure in a manner that is transparent to clients. Illustratively, a typical wide-area network (WAN) may be configured using network policy data that defines various aspects of the network. For example, typical network policy data may define regions encompassed by the typical WAN. Typical policy data may also define conventional user-managed segments, with each segment including one or more network components and facilitating user access to modify aspects of the network component(s), such as routing behavior. Conventional user-managed segments may span multiple regions within the typical WAN but remain isolated or substantially isolated from each other. Illustratively, conventional user-managed segments, or components of the segments, may not be able to communicate with each other directly. Conventional user-managed segments may be isolated in terms of routing behavior, such as source components from which the segment can receive data and/or destination components to which the source component can transmit data. One reason users may want to include user-managed segments is to separate development components used in development of a service from components used in production, where production components may be used to provide the service to end users. A user may want to separate these components to ensure that untested, and possibly inaccurate responses from development components are not provided to an end user. Accordingly, a user may create one conventional user-management segment for development and one-user managed segment for production configured to isolate production and development data. Other user-managed segments are also possible such as those directed to specific services such as customer interfaces (e.g., sales), engineering, and internet of things (IoT devices).

In addition, typical policy data may define the manner in which isolated networks (VPCs, VPNs, SD-WANs, direct connections to on-premises client networks, etc.) are to be coupled to segments as attachments, and the like. Attachments may represent network components in communication with the network through an isolated communication pipeline (also referred to herein as "connectors") to secure communications to the network from communications of other components. Attachments may include, but are not limited to, virtual private clouds, virtual private networks, and/or network appliances. Illustratively, a first component may be coupled to a network as an attachment to a first conventional user-managed segment. A second component may be coupled to a network as an attachment to a second conventional user-managed segment. Data travelling through the isolated communication pipeline between the first component and first conventional user-managed segment may be kept separate from data travelling through the isolated communication pipeline between the second component and second conventional user-managed segment.

Thus, a typical WAN may span multiple regions of the cloud provider network, and may include any number of isolated networks that may be hosted within the cloud provider network's physical data centers (e.g., VPCs) or may be physically external to the cloud provider's data centers (e.g., on-premises client networks or third-party networks communicating with the cloud provider network via VPN, SD-WAN, direct connections, etc.). This allows client traffic originating from one endpoint to be transmitted to another endpoint of the typical WAN regardless of whether one or both endpoints are within or external to the cloud provider network's physical data centers. Moreover, a client may segment traffic of a typical WAN by defining segments within the network policy data using one or more rules for attachment of isolated networks to the segments. For example, a common rule for a particular segment may specify that attachments associated with a particular tag are to be automatically associated with the segment. In some embodiments, other common rules, attributes, and the like may be specified in the policy data. For example, rules requiring authorization to attach an isolated network to a given segment, rules maintaining isolation of all attachments to a given segment, rules regarding resources to be shared among otherwise isolated attachments or segments, or the like may be defined.

In some situations, network administrators may want to incorporate common intermediate components (e.g., firewalls, identity verifiers, load balancers, etc.) in routing between specified components. Illustratively, a network administrator may want communications from a specified set of source components to pass through a firewall before reaching a specified set of destination components. Typically, addition of an intermediate component (e.g., firewalls, identity verifiers, load balancers etc.) is handled through a large number of static routes. In a typical situation, a user would generate static routes to override direct routes between source and destination components. By way of illustration, there may be a first route between a first source component and a first destination component. A first static route may be provided from the first source component through a first intermediate component to reach a first destination component. A conventional route handling system for a network may be configured such that the first static route would override the first route. This approach requires a detailed understanding of the user's network at least in terms of the components present and default routing behaviors of the components. Accordingly, these conventional static routes are often maintained by the user rather than by features within the shared network infrastructure. This disadvantageously increases use of computing resources, such as processing and memory resources.

For example, the user may need to increase memory allocation to store ever-greater numbers of conventional static routes as the network scales, such as when additional components are added to the network. Processing requirements may correspondingly increase in order to manage selection between these conventional static routes. Illustratively, there may be a plurality of potential conventional static routes between a source component and a destination component which include an intermediate component. A user may want to ensure that the shortest potential static route is selected. As the number of potential conventional static routes grows, such as when the size of the network increases, more processing resources may be required to make this determination.

Additionally, this approach is hard to scale. As the number of components in the network increase, the number of conventional static routes that would to be managed would also need to increase, increasing the complexity of management. For example, with continued reference to the illustrative example, if a second destination component was added, a second static route from the first source component through the first intermediate component to the destination component may also need to be added. Another problem with this approach is that the presence of conventional static routes generally overrides all other routes. For example, the presence of conventional static routes in a route table may override all other routes present in a route table. One or more approaches applied by the present disclosure improve upon deficiencies or errors of existing technologies in various ways at least by providing for a system that may take subsets of the route table and apply different behavior to each route.

One other technical issue that may arise is the selection of routes in accordance with specified criteria, such as route length. Route length may be the number of components that data travels through between the source and the destination.

Other potential criteria may include, but is not limited to, faster transmission from source to destination, susceptibility to security vulnerabilities, reduced computing resources in completing the transmission, and the like. Conventional static routes are typically generated by users, and users may not have a full picture of whether components within the network are accessible. Accordingly, a user working from conventional static routes may not be able to select the route that is most compliant with the specified criteria, A system-managed approach, as presented herein, may have a higher probability of selecting routes most compliant with specified criteria. One reason for this may be that a system with a full view of the network might be able to otherwise identify a route that passes through the intermediate component in compliance with specified criteria.

One or more approaches applied by the present disclosure improve upon technical deficiencies or errors of existing technologies in various ways at least by providing system-managed route generation utilizing user-specified configurations and rules for intermediate components. In the system-managed route generation approach with system managed-segments, users may not be able to communicate with intermediate components after routing is deployed to a network, such as a wide area network. Illustratively, users may be able to communicate with components in conventional user-managed segments to manage routing behavior, to call services, to obtain responses from services, etc. However, this may not be possible with system-managed network function groups. Once deployed, a user may not be able to impact routing through intermediate components or to otherwise communicate with intermediate components. Instead, impact routing through intermediate components or to otherwise communicate with intermediate components, a user may need to update user-specified configurations and rules for intermediate components in network policy data. After updates to the policy data, updated routing (e.g., route tables) may be deployed to the network.

In some aspects, a communication system may be configured to receive input from a user on user-specified configurations and rules for intermediate components. For example, the communication system may be configured to receive network policy data including user-specified configurations and rules for intermediate components. By way of illustration, a user may set up a network function group or network function groups within the network policy data. A network function group may allow for user specification of insertion attachments representing intermediate components. The attachments may be the intermediate components after the definition of a relationship between the insertion attachment and the intermediate component. Illustratively, a first intermediate component may be represented by a first attachment after a user specifies with a user device in the policy data that the first intermediate component is an attachment to the network function group. A network may generate an isolated communication pipeline between the first intermediate component and the network function group based on the policy data, such that the first intermediate component is coupled to the network function group as a first attachment. In some aspects, a user may specify a network function group including a plurality of attachments. Illustratively, a user may specify a first insertion attachment, a second insertion attachment, and a third insertion attachment. The user may then specify a first network function group including the first insertion attachment and the second insertion attachment. Additionally, or alternatively, the user may specify a network function group including the first insertion attachment, the second insertion attachment, and the third insertion attachment.

In some aspects, the user may specify rules relating to the insertion of intermediate attachments. By way of illustration, the policy data may include specification of a development segment with a first source attachment representing a first source component in the network. The policy data may also specify a production segment with a first destination attachment representing a first destination component in the network. Additionally, the policy data may specify a network function group with a first intermediate attachment. Within the policy data, the user may specify that data from the first destination attachment should be sent to the first intermediate attachment before reaching the first destination attachment. In response to this data, route tables may be generated compliant with the policy data. For example, a route generator may receive the policy data from the communication system. After receipt of this data the route generator may generate tables compliant with the policy data. Additionally, or alternatively, the route generator may modify existing route tables to comply with the policy data. For example, the route generator may modify existing tables to reflect an updated policy.

In some aspects, the user may specify multiple options for routing data. For example, the policy data may specify a development segment with a first source attachment, a production segment with a first destination attachment, and a network function group with a first insertion attachment and a second insertion attachment. In some embodiments, more than one network function group may be specified, with each network function group including at least one insertion attachment. Returning to the example, the user may specify that data from the first source attachment should be routed through the first insertion attachment prior to reaching the first destination attachment. The user may also specify a fallback option in case the data from the first source attachment cannot be routed through the first insertion attachment. For example, the first intermediate component represented by the first insertion attachment may be malfunctioning. The user may specify the second insertion attachment as a fallback option such that data is routed from the first source attachment through the second insertion attachment and to the first destination attachment.

In some embodiments, the policy data may specify a production segment, a network function group, and a development segment each spread across a first region, a second region and a third region. The segments may include different attachments in each region, multiple attachments in each region, and may also not have attachments in some regions. The development segment may include a first source attachment in the first region, a second source attachment in a second region, and no attachment in the third region. The production segment may include a first destination attachment in a first region, no attachment in the second region, and a second destination attachment in the third region. The network function group may include a first insertion attachment in the first region, and a second insertion attachment in the third region and no attachments in the first region and the third region. In some embodiments, the route generator may first attempt to comply with the policy data by finding a local insertion attachment. For example, the first insertion attachment and second insertion attachment may be in a first network function group. The policy data may specify that data from the first source attachment should pass through an insertion attachment of the first network function group prior to reaching the first destination attachment. Since the first source attachment, first insertion attachment and first destination attachment are in the same region, the route generator may create a route from the first source attachment through the first insertion attachment and then to the first destination attachment. Where a local insertion attachment is not present, the route generator may create a route to a non-local insertion attachment. For example, if the first insertion attachment were not available, the route generate may create a route from the first source attachment to the second insertion attachment to the first destination attachment.

These and other aspects of the disclosure will now be described with regard to certain examples and embodiments, which are intended to illustrate but not limit the disclosure. Although the examples and embodiments described herein will focus on, for the purpose of illustration, specific mechanisms and use cases, one of skill in the art will appreciate the examples are illustrative only and are not intended to be limiting.

Overview of Example Computing Environment

FIG. 1 illustrates an example network in which dynamic insertion of intermediate network components may be implemented according to some embodiments. Example network 120 may include a cloud provider network 101, user device(s) 110, network 120, virtual private cloud(s) 170, third party computing system(s) 180 and virtual machine mesh(es) 190. In general, the user computing device(s) 110 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The cloud provider network 101 may provide the user device(s) 110 with one or more user interfaces, command-line interfaces (CLIs), application programing interfaces (APIs), and/or other programmatic interfaces for generating and uploading user-executable code (including metadata identifying dependency code objects for the uploaded code), invoking the user-provided code (e.g., submitting a request to execute the user code on the cloud provider network 101), scheduling event-based jobs or timed jobs, tracking the user-provided code, and/or viewing other logging or monitoring information related to their requests and/or user code. Although one or more embodiments may be described herein as using a user interface, it should be appreciated that such embodiments may, additionally or alternatively, use any CLIs, APIs, or other programmatic interfaces.

The user device(s) 110, virtual private cloud(s) 170, third party computing system(s) 180, and virtual machine mesh (es) 190 may communicate with the cloud provider network 101 via a network 120, which may include any wired network, wireless network, or combination thereof. For example, each third party computing system 180 and each virtual private cloud 170 may be coupled to a segment of network 120 as an attachment. Additionally, or alternatively, each third party computing system 180 and each virtual private cloud 170 may be coupled to a segment of the cloud provider network 101 as an attachment. Illustratively, each virtual private cloud(s) 170 may connect to a user-managed segment, and each third-party computing system 180 may be connected to a system-managed segment. In some aspects, a third party computing system 180 may be hosted on a virtual private cloud 170.

Attachments may represent network components in communication with the network through an isolated communication pipeline (also referred to herein as "connectors") to secure communications to the network from communications of other components. Illustratively, a first component may be coupled to a network as an attachment to a first segment. A second component may be coupled to a network as an attachment to a second segment. Data travelling through the isolated communication pipeline between the first component and first conventional user-managed segment may be kept separate from data travelling through the isolated communication pipeline between the second component and second conventional user-managed segment.

In a user-managed segment, a user may be able to impact routing through intermediate components or to otherwise communicate with components coupled to the user-managed segment as attachments. In a system-managed segment, once deployed, a user may not be able to impact routing through intermediate components or to otherwise communicate with intermediate components. Instead, to impact routing through intermediate components or to otherwise communicate with intermediate components, a user may need to update user-specified configurations and rules for intermediate components in network policy data.

Returning to FIG. 1, the network 120 may be a personal area network, local area network, wide area network, over-the-air broadcast network (e.g., for radio or television), cable network, satellite network, cellular telephone network, or combination thereof. As a further example, the network 120 may be a publicly accessible network of linked networks, possibly operated by various distinct parties, such as the Internet. In some embodiments, the network 120 may be a private or semi-private network, such as a corporate or university intranet. The network 120 may include one or more wireless networks, such as a Global System for Mobile Communications (GSM) network, a Code Division Multiple Access (CDMA) network, a Long Term Evolution (LTE) network, or any other type of wireless network. The network 120 can use protocols and components for communicating via the Internet or any of the other aforementioned types of networks. For example, the protocols used by the network 120 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The cloud provider network 101 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

A cloud provider network 101 can be formed as a number of regions, where a region is a separate geographical area in which the cloud provider clusters data centers. In some embodiments, each region may be implemented as or otherwise treated as a region-based autonomous system ("AS"). Each region can include two or more availability zones connected to one another via a private high-speed network, for example a fiber communication connection. An availability zone ("AZ") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Regions are connected to a global network connecting each region to at least one other region. This global network can be referred to as the cloud provider backbone network in some embodiments. The cloud provider backbone network can be built on a private global, fully redundant, fiber network that is linked via trans-oceanic cables across various oceans and seas. The disclosed techniques can provide clients with a cloud wide area network ("WAN") service that enables them to use the cloud provider backbone network to connect their own on-premises networks (as well as their networks hosted on the cloud provider network) to one another.

Clients can connect to availability zones of the cloud provider network via a publicly accessible network (e.g., the Internet, a cellular communication network). Transit Centers ("TC") are the primary backbone locations linking clients to the cloud provider network and may be co-located at other network provider facilities (e.g., Internet service providers, telecommunications providers). Each region can operate two TCs for redundancy. The cloud provider network may deliver content from points of presence outside of, but networked with, these regions by way of edge locations and regional edge cache servers (points of presence, or "PoPs"). In some implementations, the cloud provider network can include one or more cellular networks managed and provided by the cloud provider, which can include access points at a client's premises, and which can use in-region resources to run various parts of the network. Clients can connect their premises to one another using the disclosed cloud WAN service via TCs, cloud-provided cellular networks, and/or edge locations.

The cloud provider network 101 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators ("NATs"), and so on, as well as the physical connections among the devices. The substrate may be isolated from the rest of the cloud provider network 101, for example it may not be possible to route from a substrate network address to an address in a production network that runs services of the cloud provider, or to a client network that hosts client resources.

The cloud provider network 101 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups).

As used herein, the term "virtual private cloud network environment" (sometimes shortened to "virtual private cloud" or simply "VPC") generally refers to a virtualized network environment, in which a collection of computing devices is enabled, for example, by a substrate network, to communicate, including for example as if the collection of computing devices existed within a local area network (LAN) environment. Accordingly, the devices within a VPC may often share a common subnet, and (from the perspective of the devices) directly communicate with one another without the use of complex routing protocols. However, unlike traditional LANs, the devices within a VPC need not share a direct physical interconnection. Instead, the devices may be located in geographically diverse regions, and in some instances may themselves be virtual devices (e.g., virtual machines). A substrate (e.g., physical) network may encapsulate or otherwise alter communications from devices associated with the VPC to create the illusion, from the point of view of devices within the VPC, that a LAN environment exists. VPCs provide many advantages over traditional LANs, in that the configuration of computing devices can be changed dynamically, via software, without changing a physical configuration of devices. Moreover, VPCs maintain many benefits of traditional LANs in that communications between the computing devices are relatively simple and secure. A single data center may include sufficient hardware to implement multiple VPCs, each of which may be isolated from each other (e.g., each VPC may include a separate substrate network). Potential components of VPCs will be discussed in more detail with respect to virtual private cloud(s) 170.

Returning to the routing of network packets within the substrate network. A mapping service can coordinate the routing of these network packets. In some embodiments, the mapping service may be part of the dynamic insertion management system 106. Illustratively, the mapping service may be executed by route generator 116 of the dynamic insertion management system 106. The mapping service can be a regional distributed look up service that maps the combination of overlay IP and network identifier to substrate IP so that the distributed substrate computing devices can look up where to send packets. To illustrate, each physical host (e.g., a compute server 122, a block store server 124, an object store server 126, a control server 112, etc.) can have a network address in the substrate network. Hardware virtualization technology can enable multiple operating systems to run concurrently on a host computer, for example as virtual machines ("VMs") on a compute server. A hypervisor, or virtual machine monitor ("VMM"), on a host allocates the host's hardware resources amongst various VMs on the host and monitors the execution of VMs. Each VM may be provided with one or more network addresses in the overlay network, and the VMM on a host may be aware of the network addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 101. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps network overlay addresses (public network addresses) to substrate network addresses (private network addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control servers 112. Control plane traffic generally includes administrative operations, such as establishing isolated virtual networks for various clients, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes client resources that are implemented on the cloud provider network 101 (e.g., computing instances, containers, block storage volumes, databases, file storage, etc., as described in greater detail below). Data plane traffic generally includes non-administrative operations such as transferring data to and from the client resources.

Certain control plane components 102 (e.g., tier one control plane components such as the control plane for a virtualized computing service) are typically implemented on a separate set of servers from the data plane components 104, while other control plane components 102 (e.g., tier two control plane components such as analytics services) may share virtualized servers with data plane components 104. Resources of the control plane can be provisioned in an account (or accounts) of the cloud provider, while resources of the data plane can be provisioned in respective user accounts.

Control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more clients. These compute servers 122 can support a virtualized computing service of the cloud provider network 101. The cloud provider network 101 may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units ("CPUs") or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a client, e.g., based (at least in part) on input from the client. For example, a client may choose an instance type from a predefined set of instance types. As another example, a client may specify the desired resources of an instance type and/or requirements of a workload that the instance will run, and the instance type selection functionality may select an instance type based on such a specification.

The data plane can also include one or more block store servers 124, which can include persistent storage for storing volumes of client data as well as software for managing these volumes. These block store servers can support a managed block storage service of the cloud provider network 101. The block store servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object store servers 126, which represent another type of storage within the cloud provider network 101. The object storage servers 126 include one or more servers on which data is stored as objects within resources referred to as buckets and can be used to support a managed object storage service of the cloud provider network 101. Each object typically includes the data being stored, a variable amount of metadata that enables various capabilities for the object storage servers with respect to analyzing a stored object, and a globally unique identifier or key that can be used to retrieve the object. Each bucket is associated with a given user account. Clients can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Clients may use buckets to store objects of a variety of types, including machine images that can be used to launch VMs, and snapshots that can be used to restore volumes.

In some embodiments, the data plane may include one or more gateway nodes 140 configured to implement aspects of the present disclosure for routing data packets through the cloud provider network 101 from sources to destinations. A gateway node 140 may be implemented on a device (e.g., router, server, etc.) or set of devices separate from storage servers and compute servers of the data plane 104. In some embodiments, a gateway node 140 may share one or more virtualized servers with storage or compute servers. In some embodiments, gateway nodes 140 or certain modules or components thereof may be part of the control plane such that they are control plane components 102.

The virtual private cloud(s) 170 may each represent private virtualized networks. The virtual private cloud(s) 170 may each include one or more servers 172, an optional cache data store 174, and a communication manager 176. Components of one virtual private cloud 170 may be substantially similar to the components in other virtual private cloud(s) 170. The server(s) 172 may generally provide any network-accessible functionality, such as web page hosting or database hosting, among many others known in the art. The communication manager 176 may configure, authorize, and/or otherwise manage communications internal to a virtual private cloud 170 and/or between a virtual private cloud 170 and other computing systems, such as the cloud provider network 101. For example, the communication manager 176 may provide logical networking functionality for one or more virtual computer networks that are provided within a virtual private cloud 170. As an illustrative example, the communication manager 176 may manage communications between the server(s) 172 and the cache data store 174, if present. As another example, the communication manager 176 may encapsulate any packets generated by the one or more server(s) 172 for transmissions external to a virtual private cloud 170 and decapsulate received encapsulated packets (e.g., received from the access gateway 160 of the on-demand code execution system). While FIG. 1 depicts the virtual private cloud(s) 170 as being external to the cloud provider network 101, this is not meant to be limiting. For example, none, some, or all of the virtual private cloud(s) 170 may be run by the cloud provider network 101.

Each third party computing system of third party computing system(s) 180 may include one or more servers that may provide a variety of resources to user devices (e.g., user device(s) 110) and/or that are configured to process received data for logging, authentication, encryption, billing, and/or any other computing-based purpose. For example, the one or more servers may be web servers that are accessible via a uniform resources locator (URL). Further, such third party computing system(s) 180 may be accessible over the network 120 by using the Internet protocol suite. The Internet protocol suite (or commonly known as TCP/IP) is a technical standard that sets the framework for allowing communications over the Internet. As is well-known by skilled artisans, the Internet protocol suite includes multiple layers (Ethernet, Internet Protocol, Transport, etc.). Each layer provides an encapsulation to a payload (e.g., data) to facilitate the communication over the network (e.g., network 120). Additionally, or alternatively, each third party computing system of third party computing system(s) 180 may represent a network appliance, such as a firewall. Network appliances may be computing resources which aid in the communication of data between other systems within a network. Network appliances may include, but are not limited to caches, firewalls, authentication systems, and address management (e.g., network address management). While FIG. 1 depicts the third party computing system(s) 180 as being external to the cloud provider network 101, this is not meant to be limiting. For example, none, some, or all of the third party computing system(s) 180 may be run by the cloud provider network 101.

The virtual machine mesh(es) 190 may include one or more virtual machine instances that execute tasks at different times, concurrently, and/or overlapping in time. None, some, or all of the virtual machine instances in the virtual machine mesh(es) 190 can work together to execute a task. the virtual machine mesh(es) 190 may be a virtualized network in which the tasks executed by individual virtual machine instances in the virtual machine mesh(es) 190 are isolated from the operating system. In other words, the individual virtual machine instances in the virtual machine mesh(es) 190 provide both isolation and security. More specifically, the individual virtual machine instances in the virtual machine mesh(es) 190 run on top of the operating system, and the virtual machine mesh(es) 190 may provide an application programming interface (API), network, storage, and management tools needed to operate each virtual machine instance. In addition, the virtual machine mesh(es) 190 can create and/or manage virtual machine instances that are small and isolated, and the virtual machine mesh(es) 190 can create the virtual machine instances in large volumes. Optionally, some or all of the virtual machine instances in the virtual machine mesh(es) 190 may be micro virtual machine instances. While FIG. 1 depicts the virtual machine mesh(es) 190 as being external to the cloud provider network 101, this is not meant to be limiting. For example, none, some, or all of the virtual machine instances that form the virtual machine mesh(es) 190 may be run by the cloud provider network 101.

Dynamic insertion management system 106 may be configured to generate or modify routing between components of the network 120, such as cloud provider network 101, virtual private cloud(s) 170, third party computing system(s) 180, and virtual machine mesh(es) 190. While FIG. 1 depicts the dynamic insertion management system 106 as being external to the cloud provider network 101, this is not meant to be limiting. For example, none, some, or all of the dynamic insertion management system 106 may be run by the cloud provider network 101. The dynamic insertion management system 106 may include a communication system 114, and a route generator 116. The communication system 114 may be configured to receive user input on routing behavior for the network 120 including specification of one or more intermediate components. The specification of one or more intermediate components may include routing behavior for the one or more intermediate components. As an example, a user via a user device 110 may specify that a data from a first source component should pass through a first intermediate component prior to reaching a first destination component. Additionally, or alternatively, a user may specify via a user device 110 that data for source components identified with network addresses (e.g., network addresses) in a first range should pass through the first intermediate component prior to reaching a first destination component. Additionally, or alternatively, a user may specify that data for source components identified with network addresses in a first range should pass through the first intermediate component prior to reaching a destination component identified with network addresses in a second range. Additionally, or alternatively, a user may specify that data for source components identified with network addresses in a first range should pass through the first intermediate component prior to reaching a destination component identified with network addresses in a second range. Additionally, or alternatively, a user via a user device 110 may specify that data for source components identified with network addresses in a first range should pass through at least one of a group of intermediate components prior to reaching a destination components identified with network addresses in a second range.

In some embodiments, the user may provide via user device 110 this specification through policy data for a network. Illustratively, the communication system 114 may be configured to access policy data relating to the network 120. For example, the communication system 114 may be in communication with a user device 110 that displays a user interface. The communication system 114 may request input from the user device 110 on the network policy (where the request may be displayed in the user interface), and the user may then provide this input. Additionally, or alternatively, the user enter the policy data into a user interface and this data may then be transmitted by the user device 110 to the communication system 114 through the cloud provider network 101.

The policy data may provide specification for one or more intermediate components. Of course, the user may specify more than one insertion attachment. For example, the user may further specify that the network function group should include a second insertion attachment representing a second intermediate component. In some embodiments, intermediate components may be network appliances. Network appliances may be computing resources which aid in the communication of data between other systems within a network. Network appliances may include, but are not limited to, caches, firewalls (e.g., Next-Gen Firewall (NGFW)), Intrusion Detection/Prevention (IDS/IPS), authentication systems, Deep Packet Inspection, Uniform Resource Locator (URL) filtering, and address management (e.g., network address management). Additionally, or alternatively, intermediate components may include, but are not limited to, VPCs, VPNs, or LANs. Illustratively, VPCs may include network appliances. As another example, VPCs may include application-specific services for insertion in routing within the network environment.

In some embodiments, to representing intermediate component(s) as attachment(s), a user may specify through user device(s) 110 that the network 120 should include an network function group with the intermediate component included as an attachment. An attachment may be a representation of the intermediate component as coupled to an network function group as indicated in the policy data. The system may use the definition of the intermediate component as an attachment to the network function group in the policy data to manage routing as will be discussed in more detail below with respect to the dynamic insertion management system 106. For example, the definition of a first intermediate component as a first insertion attachment in a first segment may cause the dynamic insertion management system 106 to generate and link an attachment id representing the first insertion attachment and the first intermediate component to a segment id for the first network function group. This may facilitate the flow of data directly to or directly from the first insertion attachment to the first network function group after deployment to the network. Deployment to the network may include dynamic insertion management system 106 transmitting route tables generated based on the policy data to the network 120. The network function group may be a system-managed segment. As a brief review, in a system-managed segment, the user may not be able to communicate with the intermediate components represented by insertion attachments after deployment, which may include deployment of route tables through the intermediate components to the network 120. The user may further specify that the network function group should include a first insertion attachment representing a first intermediate component.

In some embodiments, the user may specify routing behavior through user device(s) 110 for the insertion attachments. For example, the user may specify through user device(s) 110 that data from a source attachment in a first segment should pass through the first insertion attachment prior to reaching a first destination attachment in a second segment. As another example, the user may specify through user device(s) 110 that data from a source attachment in the first segment should pass through at least one of the first insertion attachment or the second insertion attachment prior to reaching the first destination attachment. This approach can be scaled to larger groups of attachments as well. For example, the user may specify through user device(s) 110 that source attachments identified with network addresses (e.g., IP addresses) in a first range (e.g., classless inter-domain routing (CIDR) range) should pass through insertion attachments with network addresses in a second range prior to reaching destination attachments with network addresses in a third range. As another example, a user may specify through user device(s) 110 that source attachments identified with network addresses in a first range (e.g., CIDR range) should pass through a specified insertion attachment.

After receipt of user-specification regarding intermediate components through user device(s) 110, the dynamic insertion management system 106 may be configured to deploy the network or deploy updates to the network in compliance with the policy data. In some embodiments, deploying the network may include generation of route tables compliant with the policy data. For example, the route generator 116 of the dynamic insertion management system may be configured to generate route tables compliant with the policy data. Illustratively, the policy data may specify that data from a first source attachment should pass through at least one of a first insertion attachment and a second insertion attachment prior to reaching a destination attachment. The route generator 116 may generate a route table including routes from the first source attachment through one or both of the first insertion attachment and second insertion attachment prior to reaching the destination attachment. For example, the route generator 116 may access transient metadata (e.g., border gateway protocol (BGP)) indicating a grouping for a route. The grouping may include, but is not limited to a source attachment, an insertion attachment, or a destination attachment. Using the groupings within the transient metadata, the route generator 116 may generate route tables. For example, the transient metadata may include community attributes. Illustratively, a first subset of the community attributes may correspond to a first source attachment. Route generator 116 may search within the transient metadata for a first subset transient metadata corresponding to the first subset of community attributes. The first subset of transient metadata may include other route data including insertion attachments and destination components with respect to routes to or from the first source attachment. Based on this data, the route generator 116 may generate a route table for the first source attachment.

For example, the route generator 116 may generate route tables for each attachment. Based on the policy data, the route generator 116 may apply different routing for each route or for different subsets of routes. For example, the route generator 116 may apply different routing based on the segment and region of the attachment. Additionally, or alternatively, the route generator 116 may apply different routing based on the source and destination for a route, as will be discussed in more detail in FIGS. 3-5.

Additionally, or alternatively, the route generator 116 of the dynamic insertion management system 106 may be configured to modify existing route tables to comply with the policy data. For example, the policy data may specify that data from a first source attachment should proceed through a first insertion attachment prior to reaching a first destination attachment. The route generator 116 may select routes from a route table associated with a first source attachment that proceed to a first destination attachment. Based on the policy data, the route generator 116 may update these routes to proceed to a first network function group. The route generator 116 may then update or generate a route table to a first network function group to route data received from the first source attachment to the first destination attachment. In some embodiments, the route generator 116 may update routes by overriding existing route. For example, the route generator 116 may generate a new route in accordance with policy data and configure the new route to have priority over the existing route. In other words, the network 120 may prioritize use of the new route over the existing route based on the configuration provided by the route generator 116.

In some aspects, policy data may impact the generation of routes by restricting the routes generated by route generator 116 to those compliant with the policy data. Illustratively, policy data may indicate that a route from the first source attachment should travel through a first insertion attachment prior to reaching a first destination attachment. Route generator 116 may generate routes compliant to this policy. By way of example, to generate routes, route generator 116 may access a network model, where the network model includes nodes representative of components and/or attachments of a network. The network model may also include features representing segments and regions of the network. Using this network model, route generator 116 may determine potential routes between the first source attachment and the first destination attachment. The route generator 116 may then narrow the search to potential routes between the first source attachment and the first destination attachment including the insertion attachment, and generate a route table with those routes. Of course, route generator 116 may also determine potential routes compliant with the policy data without narrowing an initial search. For example, using the network model, route generator 116 may determine potential routes between the first source attachment through the first insertion attachment prior to reaching the first destination attachment instead of first determining potential routes between the first source attachment and the first destination attachment.

Additionally, or alternatively, the route generator 116 may access transient metadata for data traveling through the network. To generate a route table for a first segment coupled to a first source attachment, the route generator 116 may access a first subset of transient metadata, where the first subset of transient metadata corresponds to the first segment. Of course, the route generator 116 may also access a first subset of transient metadata, where the first subset of transient metadata corresponds to the first source attachment. Based on the data in the first subset of transient metadata and the policy data, the route generator 116 may generate a route table for the first segment. Illustratively, the route generator 116 may generate an initial set of routes from the first subset of transient metadata. The route generator route generator 116 may search within the initial set for routes compliant with the policy data. For example, route generator 116 may search within the initial set for a second subset of routes from the first source attachment including the first insertion attachment prior to reaching the first destination attachment. The route generator 116 may then generate a route table for the first segment with the second subset of routes.

Figure 2:
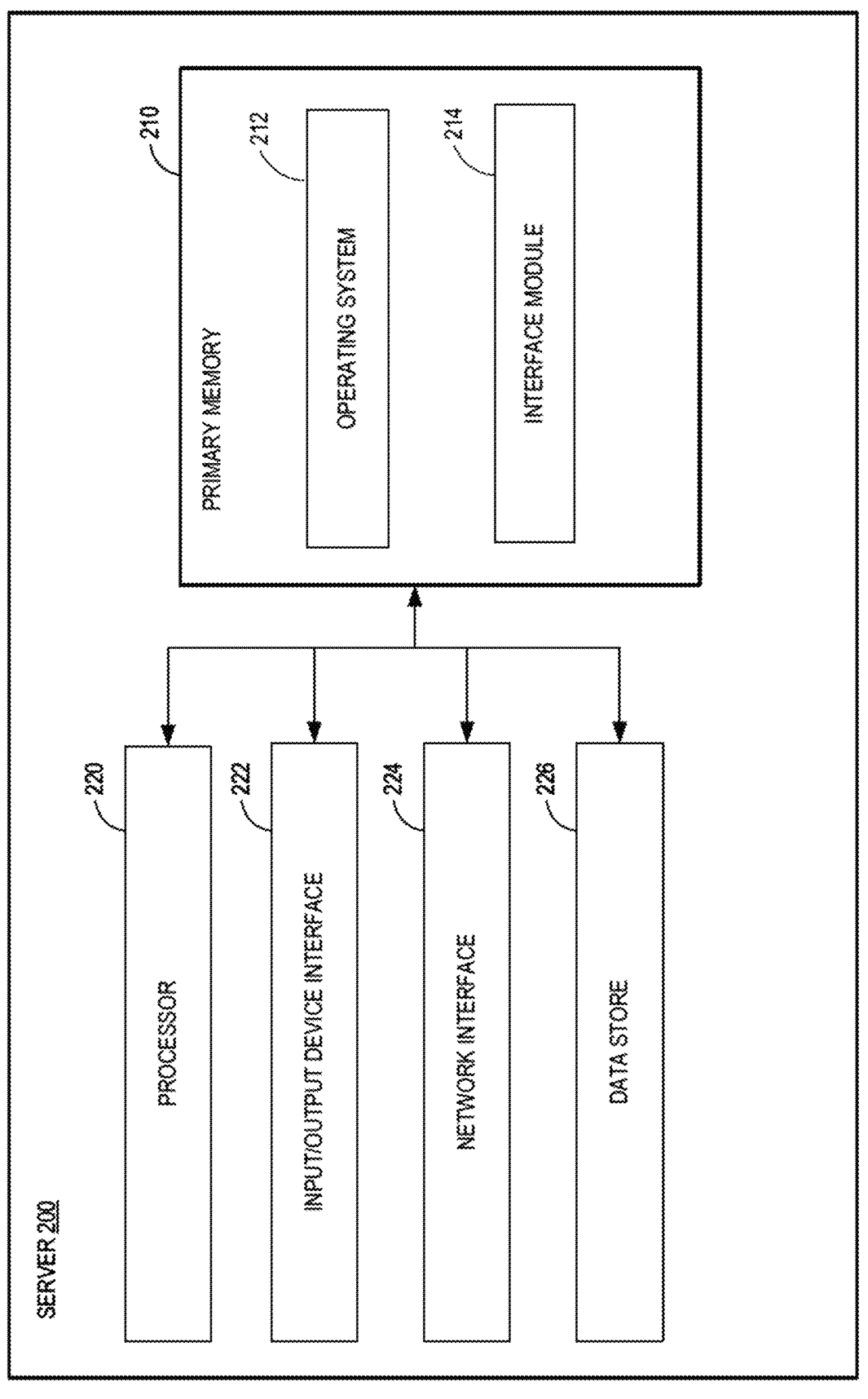
FIG. 2 is a block diagram of a server that may be used to operate dynamic insertion of intermediate network components according to some embodiments.

FIG. 2 depicts a general architecture of a server 200 computing device used to implement one or more servers illustrated in FIG. 1. This includes, but is not limited to, compute server(s) 112, compute server(s) 122, block store server(s) 124, object store server(s) 126, and server(s) 172. The general architecture of the server 200 includes an arrangement of computer hardware and software that may be used to implement aspects of the present disclosure. The hardware may be implemented on physical electronic devices, as discussed in greater detail below. The server 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the server 200 includes a processor 220, an input/output device interface 222, a network interface 224, a data store 226, all of which may communicate with one another by way of a communication bus. The network interface 224 may provide connectivity to one or more networks or computing systems. The processor 220 may thus receive information and instructions from other computing systems or services via the network 120. The processor 220 may also communicate to and from primary memory 210 or data store 226 and further provide output information for an optional display (not shown) via the input/output device interface 222. The input/output device interface 222 may also accept input from an optional input device (not shown).

The primary memory 210 or data store 226 may contain computer program instructions (grouped as units in some embodiments) that the processor 220 executes in order to implement one or more aspects of the present disclosure. These program instructions are shown in FIG. 2 as included within the primary memory 210. However, the program instructions may additionally, or alternatively, be stored within data store 226. The primary memory 210 and data store 226 correspond to one or more tiers of memory devices, including (but not limited to) RAM, 3D XPOINT memory, flash memory, magnetic storage, and the like. The primary memory 210 is assumed for the purposes of description to represent a main working memory of the server 200, with a higher speed but lower total capacity than data store 226.

The primary memory 210 may store an operating system 212 that provides computer program instructions for use by the processor 220 in the general administration and operation of the server 200. The primary memory 210 may further include computer program instructions and other information for implementing aspects of the present disclosure. For example, in one embodiment, the primary memory 210 includes an interface module 214 that generates user interfaces (or instructions therefor) for display upon a computing device, e.g., via a navigation or browsing interface such as a browser or application installed on the computing device.

The server 200 of FIG. 2 is one illustrative configuration of such a device, of which others are possible. For example, while shown as a single device, a server 200 may in some embodiments be implemented as multiple physical host devices.

Example Software-Defined Wide Area Network

Figure 3A:
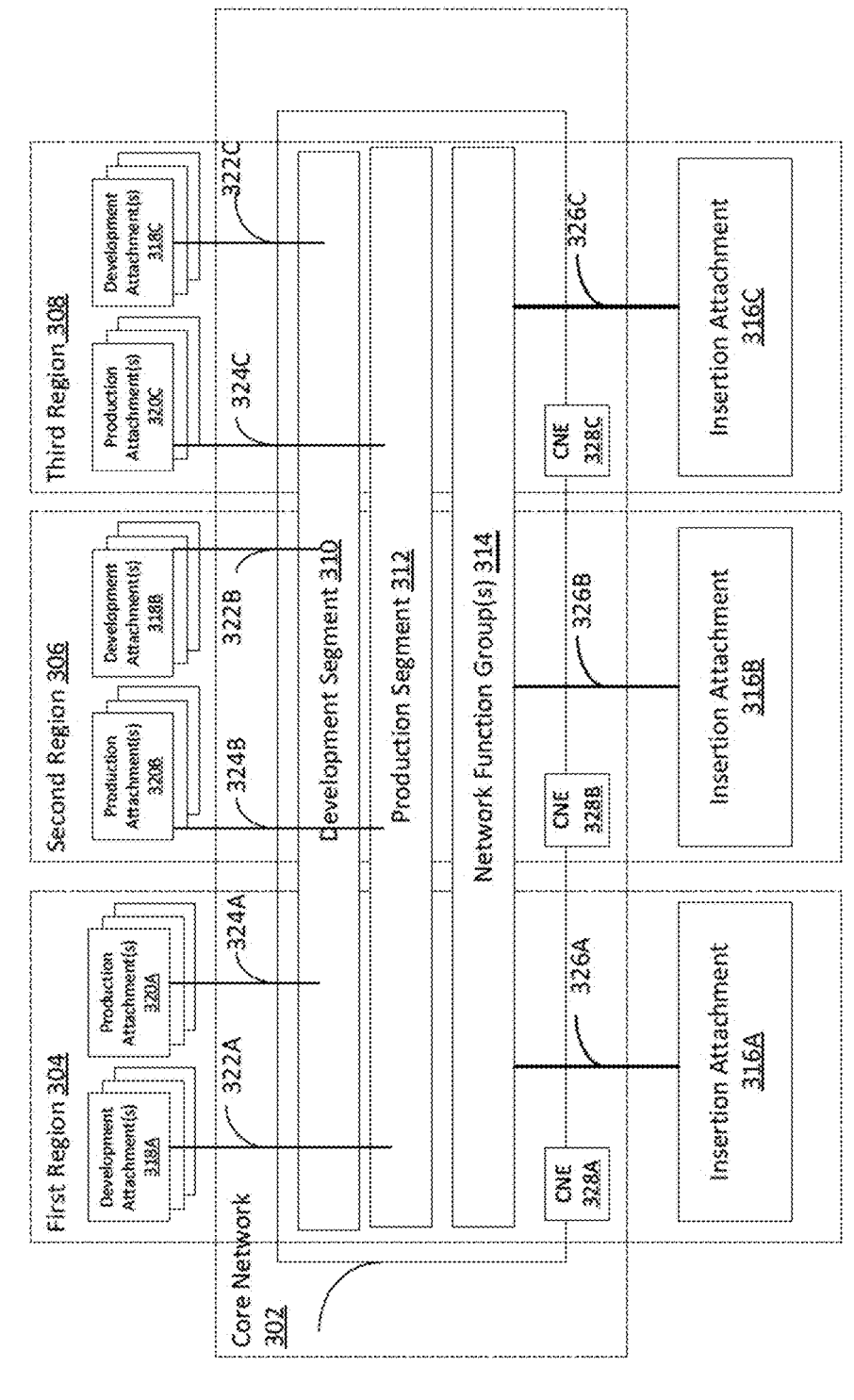
FIG. 3A is a graphical representation of a software defined wide area network with network function groups, segments, regions, attachments, and shared routes based on the network definition according to some embodiments.

FIG. 3A illustrates an example software-defined wide area network (SD-WAN) 300 implemented at least in part using hardware at least in part using hardware and services of the cloud provider network 101. For example, the SD-WAN 300 may be implemented using a cloud WAN service of the cloud provider network 101.

The SD-WAN 300 may be implemented to encompass multiple regions of the cloud provider network 101 and uses the cloud provider network 101 infrastructure to transport data between components of the cloud provider network 101, without necessarily using other compute or storage resources of the cloud provider network 101. For example, this SD-WAN may have no connectivity to any VPC hosted within the cloud provider network 101. Rather, it uses the cloud provider network 101 as transport between components and for network (e.g., Internet) access.

The example SD-WAN 300 may encompass multiple regions of the cloud provider network 101: a first region 304, a second region 306, and a third region 308. The regions may correspond to different geographic regions, such as different neighborhoods, cities, counties, states, provinces, countries, and/or continents. The example SD-WAN 300 may include a core network 302. The core network 302 may span or encompass one or more regions. The core network 302 may include core network edges (CNE), such as CNE 328A, CNE 328B, and CNE 328C. Each CNE may act as a regional connection point for core network 302 or SD-WAN 300. CNEs 328 can encompass single or multiple network segments that act as isolated routing domains, where isolation indicates that each segment can have different routing behaviors. Isolation may also indicate that attachments in each segment do not communicate directly with each other. Instead, data is routed between them in compliance with the network policy, as will be explained in more detail in FIGS. 4-5. CNEs may also support multi-tenancy of an attachment, such as a virtual private cloud. For example, in some embodiments, multiple users may access a service hosted on a virtual machine. It may be advantageous for each user to access the service through a different connection or to access the service through different virtual machines. CNEs may support this functionality handling incoming requests for a service with respect to user identifiers. In some embodiments, the core network 302 may act as the routing and connectivity backbone for SD-WAN 300, as will be described in more detail in FIGS. 4-5.

In addition, the SD-WAN 300 may include a development segment 310 and a production segment 312, and a network function group(s) 314, which may also span or encompass multiple regions of the cloud provider network 101. Segments, such as development segment 310 and production segment 312, may be isolated routing domains on the core network 302 where each segment may have its own routing behavior. By way of illustration, attachments in a first segment may not communicate with attachments in a segment in a second segment. Instead, data is routed between them in compliance with the network policy as will be explained in more detail in FIGS. 4-5. After deployment, a user may have full visibility into routes for a segment and may still be able to add, delete or share routes within a segment after deployment of the network.

There may be several attachments to each segment of the SD-WAN 300. For example, the development segment 310 may be connected to development attachment(s) 318A through connector 322A, development attachment(s) 318B through connector 322B, and development attachment(s) 318C through connector 322C. Production segment 312 may be connected to production attachment(s) 320A through connector 324A, production attachment(s) 320B through connector 324B, and production attachment(s) 320C through connector 324C. Development attachments may include, but are not limited to, virtual private clouds (VPCs), virtual private networks (VPNs) or local area networks (LANs).

Network function group(s) 314 may include one or more individual network function groups. Each network function group of the core network 302 may be a collection of attachments that point to specialized network or security functions. Network function groups may span or encompass all regions of a core network. For example, a network function group may include attachments from multiple regions, such as first region 304, second region 306, and third region 308. However, a network function group may not always include an attachment from every region. For example, a network function group of network function group(s) 314 may only include attachments one region. such as first region 304. As another example, a network function group of network function(s) group 314 may include attachments from two regions, such as second region 306 and third region 308. While each network function group may have its own route tables, these routes may be automatically propagated by the dynamic insertion management system 106, based on the policy data (also referred to herein as "network policy"). A user may have full visibility into these routes after deployment of the network. However, a user may not be able to add, delete or share routes within a network function group after deployment of the network.

Each network function group 314 may be connected to an insertion attachment 316. For example, network function group 314 may be connected to insertion attachment 316A through connector 326A, to insertion attachment 316B through connector 326B, and to the insertion attachment 316C through connector 326C. Each insertion attachment may represent an intermediate component.

Figure 3B:
FIG. 3B is a graphical representation of a software defined wide area network with segments, regions, attachments, and shared routes based on the network definition according to some embodiments.

With reference to FIG. 3B, in some embodiments, insertion segments may be used in addition to or instead of network function group(s) 314. Each insertion segment may be specific to a region. For example, an insertion segment for the first region 304 may include only attachments in first region 304, such as insertion attachment 316A. In embodiments with insertion segments, not all regions spanned by a core network, such as core network 302, may include an insertion segment. While each insertion segment may have its own route table, these routes may be automatically propagated by the dynamic insertion management system 106, based on the policy data (also referred to herein as "network policy"). A user may have full visibility into these routes after deployment of the network. However, a user may not be able to add, delete or share routes within an insertion segment after deployment of the network.

Each insertion segment 315 may be connected to an insertion attachment 316. For example, insertion segment 315A may be connected to insertion attachment 316A through connector 326A. The insertion segment 315B may be connected to insertion attachment 316B through connector 326B, and the insertion segment 315C may be connected to the insertion attachment 316C through connector 326C. Each insertion attachment may represent an intermediate component.

In some embodiments, insertion attachment may represent an intermediate component, such as a network appliance. For example, the insertion attachment may be the intermediate component after a definition in policy data of the network appliance which captures its connection to a network function group. For example, a user with a user device (e.g., user device(s) 110 of FIG. 1) may define in the network policy a segment including a list of attachment ids where each attachment id corresponds to a component, such as a network appliance. This definition may be used by the system in managing routing for the component. For example, definition of a first component as a first attachment to the first segment in the policy data may facilitate the flow of data between the first component and the first segment. Illustratively, based on the definition in the policy data, the dynamic insertion management system 106 may generate an isolated communication pipeline (also referred to herein as "connector") between the first component, now the first attachment, and the first segment.

As a brief review, network appliances may be computing resources which aid in the communication of data between other systems within a network. Network appliances may include, but are not limited to caches, firewalls (e.g., Next-Gen Firewall (NGFW)), Intrusion Detection/Prevention (IDS/IPS), authentication systems, Deep Packet Inspection, Uniform Resource Locator (URL) filtering, and address management (e.g., network address management). Additionally, or alternatively, insertion attachments may include, but are not limited to, VPCs, VPNs, or LANs. Illustratively, VPCs may include network appliances. As another example, VPCs may include application-specific services for insertion. In further embodiments, these VPCs may be coupled to the network as network function groups.

Figure 3C:
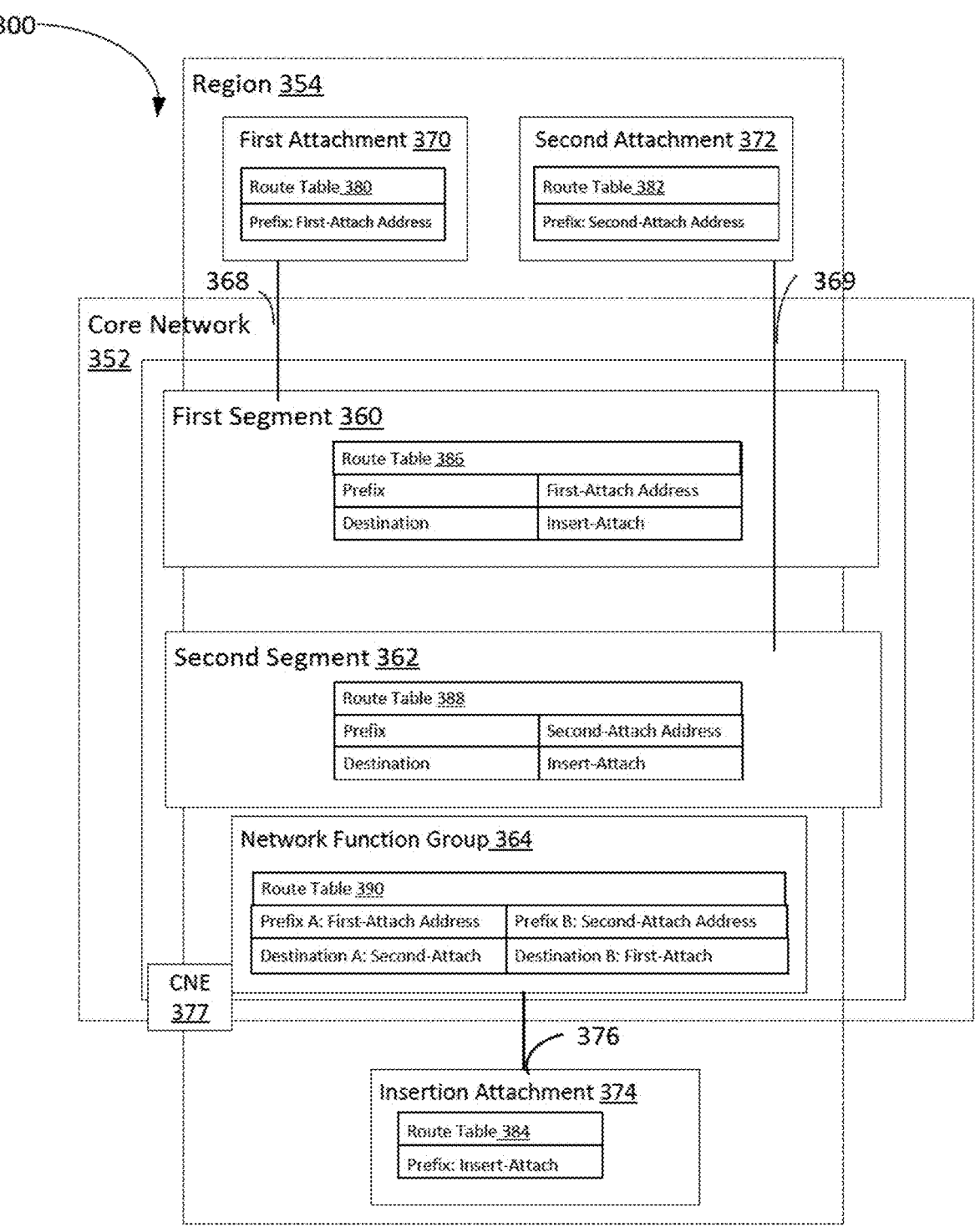
FIG. 3C is a graphical representation of a software defined wide area network with network function groups, segments, regions, attachments, and shared routes as deployed on the network according to some embodiments.

FIG. 3C is a graphical representation of a software defined wide area network (SD-WAN) 350 with segments and attachments, and shared routes as deployed on the network according to some embodiments. SD-WAN 350 may include core network 352, region 354, first segment 360, second segment 362, and network function group 364. First segment 360 may be connected to first attachment 370 through connector 368. Second segment 362 may be connected to second attachment 372 through connector 369. Core network 352 may include core network edge CNE 377. Each segment and attachment may include a route table, as will be described in more detail below. In some aspects, software-defined wide area network 350 and its components may be substantially the same as SD-WAN 300 and its components. While FIG. 3B depicts one region, this is not intended to be limiting. Software-defined wide area network 350 may include any number of segments.

As illustrated in FIG. 3C, route tables may include, but are not limited to including, an attachment identifier ("identifier" for brevity) and a destination. The attachment identifier may indicate a network address including, but not limited to, an IP address or a CIDR prefix. In some embodiments, the attachment identifier may be a network address corresponding to a specified attachment. For example, first attachment 370 may include a route table 380 which includes an identifier of "first-attach-address," which indicates a network address corresponding to first attachment 370. Second attachment 372 may include a route table 382 which includes an identifier of "second-attach-address" indicating a network address corresponding to second attachment 372. Insertion attachment 374 may include a route table 384 which includes an identifier of "insert-attach-address" indicating a network address corresponding to insertion attachment 374.

In some embodiments, the identifier may represent a source. For example, first segment 360 may include a route table 386 which includes an identifier "first-attach-address" to indicate that that the source of data transmitted in the specified route may be the first attachment 370. Route table 386 may also include a destination of "insert-attach-address" to indicate that the destination of this portion of the route is insertion attachment 374. Network function group 364 may include a route table 390 which includes an identifier A of "first-attach-address" and a destination A of "second-attach." This may indicate that data received from first attachment 370 should be from the network function group 364 to the insertion attachment 374 and from there to second attachment 372. In addition, network function group 364 may include a route table 390 which includes an identifier B of "second-attach-address" and a destination B of "first-attach." This may indicate that data received from second attachment 372 should be sent from the network function group 364 to the insertion attachment 374 and from there to first attachment 379. The route tables 386, 388, and 390 may include this information to comply with a network policy.

In some embodiments, route tables that may be used to comply with network policy. The route tables may be generated by the route generator 116 of FIG. 1. By way of illustration, transient metadata (e.g., border gateway protocol (BGP)) may be used to exchange routing information within SD-WAN 350 and/or within core network 352. For example, each route may have an assigned community based on transient metadata corresponding to the route. The communities may share a common source. The common source may represent, but is not limited to representing, a source segment, a source region, network function groups, network addresses, ports, or some combination thereof.

Routes may be grouped by community into route tables, and the route generator 116 may apply different routing behaviors to each table. The route generator 116 may also be configured to select routes based on region or segment of the route. For example, a network policy may state that for data travelling between a first region and second region should go through an insertion attachment in a first region. As another example, a network policy may state that that for data travelling between a first segment (e.g., first segment 360) and a second segment (e.g., second segment 362) should go through a first insertion attachment (e.g., network function group 364). The route generator 116 may first select routes from a first segment route table (e.g., route table 386) that are known to route to a second segment 362. The route generator 116 may then override those routes, at least with respect to the portion of the route between the first segment 360 and the second segment 362. Illustratively, the route generator 116 may add a route directing data from the first segment 360 to the insertion attachment 374. The route generator 116 may also add a route directing data from the network function group 364 to the second segment 362.

Figure 4:
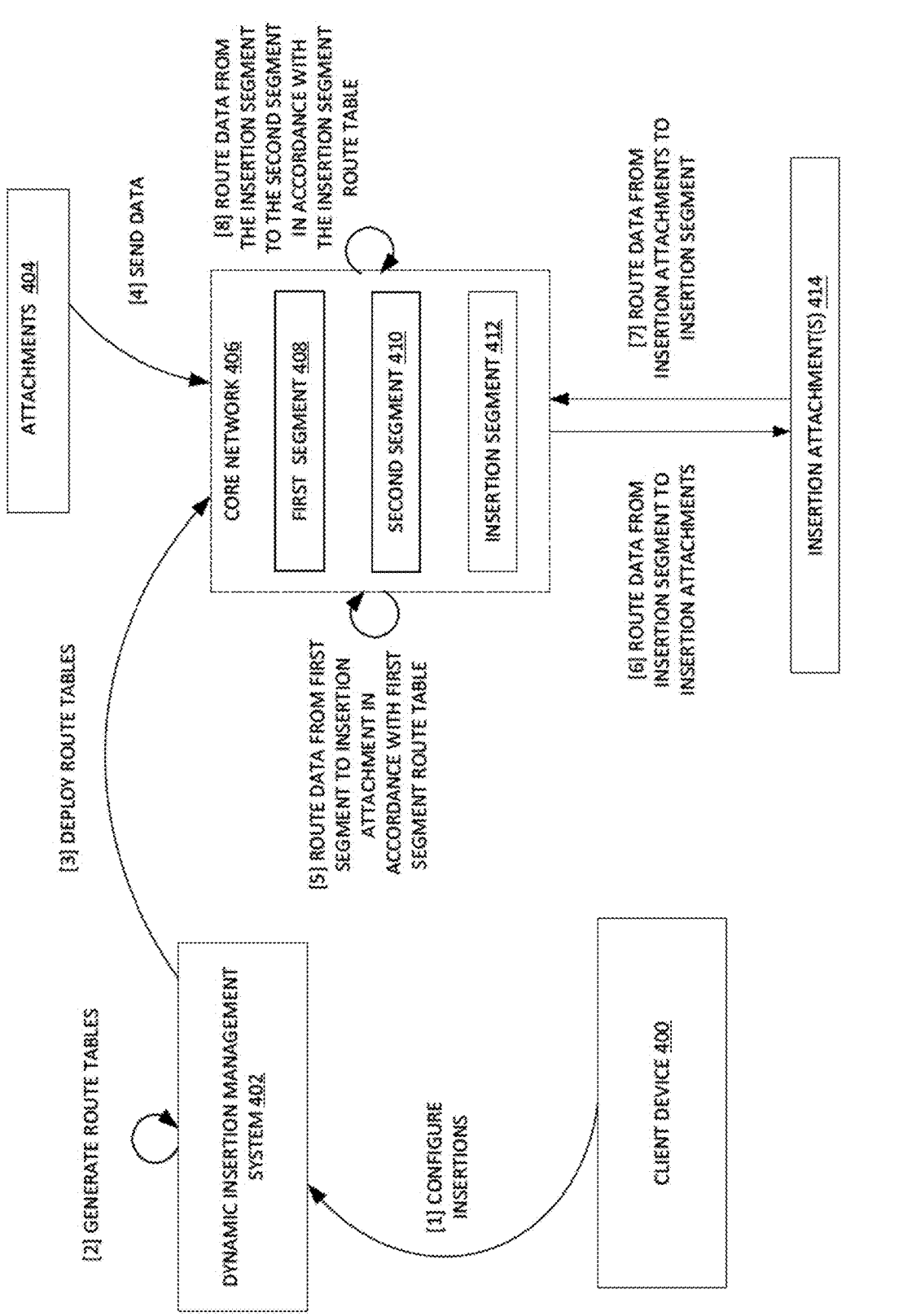
FIG. 4 illustrates example interactions between components of a software-defined wide area network in accordance with some embodiments.

Example Interactions Between Components of a Software-Defined Wide Area Network FIG. 4 illustrates example interactions between components of a software-defined wide area network (e.g., network 120 of FIG. 1, SD-WAN 300 of FIGS. 3A-3B, SD-WAN 350 of FIG. 3C, etc.) in accordance with some embodiments. Specifically, FIG. 4 illustrates example interactions between a client device 400, a dynamic insertion management system 402, attachments 404, core network 406, and insertion attachments 414. Core network 406 may include first segment 408, second segment 410, and network function group 412. Note that, in some embodiments, the client device 400 may be substantially similar to user device(s) 110 of FIG. 1, the dynamic insertion management system 402 may be substantially similar to dynamic insertion management system 106 of FIG. 1, and core network 406 may be substantially similar to core network 302 of FIGS. 3A-3B and/or core network 352 of FIG. 3C. The components of core network 406 may also be substantially similar to the components of core network 302 of FIGS. 3A-3B and/or core network 352 of FIG. 3C. Insertion attachment(s) 414 may be substantially similar to insertion attachments 316 of FIGS. 3A-3B and/or insertion attachment 374 of FIG. 3C. Attachments 404 may be substantially similar to development attachments 318 and/or production attachments 320 of FIGS. 3A-3B. Additionally, or alternatively, attachments 404 may be substantially similar to first attachment 370 and/or second attachment 372 of FIG. 3C.

The interactions of FIG. 4 begin at [1] where the client device 400 configures insertions. For example, the client device 400 may provide updates to a policy document which contains network policy (also referred to herein as "policy data"). By way of illustration a user may access the network policy with a user interface. For example, the network policy may be accessible to the user through a network policy document. In the document, the user may first create a network function group. In some embodiments, the user may create a network function group, where creating the network function group maps the insertion attachments with a key.

In a non-limiting example, insertion attachments added to a first network function group may represent virtual private clouds (VPCs) running attachment services. The first network function group may then be assigned an "first-network-function-group" key. This key may allow that attachments of a network function group be more easily grouped together. For example, a service of the dynamic insertion management system 402 may group together insertion attachments for network function groups by their assigned key and store them for later use in route generation for the network 120.

In some embodiments, network policy may define routing behavior with respect to insertion attachments in a network (e.g., network 120 of FIG. 1, network 300 of FIGS. 3A-3B, network 350 of FIG. 3C, etc.). In another non-limiting aspect, the definition may steer data from the "Production" segment to all other segments through the network function group "first-network-function-group," This definition of routing behavior in the network policy may result in data from the "Production" segment through at least one of the attachments of the "first-network-function-group." In some embodiments, the user may also specify user may specify through a user device (e.g., through user devices device(s) 110 of FIG. 1) a subset of attachments to be routed through at least one of the attachments of the "first-network-function-group."

For example, the user may specify through a user device (e.g., through user devices device(s) 110 of FIG. 1) that attachments from the production segment with a first range (e.g., CIDR range) of addresses (e.g., network addresses) should be routed to a first network function group. With reference to the illustrative embodiment of FIG. 3B, identifiers may represent addresses. In further embodiments, the user may specify user may specify through a user device (e.g., through user devices device(s) 110 of FIG. 1) that attachments from the production segment within a second range of addresses should be routed to a second network function group.

The client device 400 may also configure the routing behavior of other components with respect to insertion attachments. For example, with reference to the illustrative embodiment of FIG. 3A, a user may include a rule in the network policy to route traffic from development attachment(s) 318A to insertion attachment 316A prior to reaching production attachment(s) 318A. Additionally, or alternatively, the user may include a rule to route data from development segment 310 to network function group 314 prior to reaching production segment 312. For example, the development segment 310 may receive data from one or more development attachment(s) 318. The development segment 310 may route received data to insertion an network function group 314, in compliance with the network policy. The network function group 314 may be configured to route data from network function group 314 to a connected insertion attachment, such as insertion attachment 316A. Illustratively, insertion attachment 316A may be a security service (e.g., a network address authenticator, etc.) or may be a VPC including a security service. The insertion attachment may process received data by executing the security service. If there are no issues resulting from execution of the service (e.g., a security failure), the insertion attachment may route the data back to network function group 314. The network function group 314 may then route the data to production segment 312. With reference to the illustrative embodiment of FIG. 3B, a user may include a rule to route data from development segment 310 to insertion segment 315A prior to reaching the production segment 312. The insertion segment 315A may be configured to route data to insertion attachment 316A. If there are no issues resulting from execution of the service (e.g., a security failure), the insertion attachment may route the data back to insertion segment 315A, and insertion segment 315A may then route the data to production segment 312.

While the above examples reference routing data from the development segment 310 or development attachments 318 to one of network function group(s) 314, insertion segment(s) 315, or insertion attachments 316, this is not intended to be limiting. A user may configure network policy to route data from the production segment to the development segment. Additionally, or alternatively, the user may configure network policy to manage routing behavior between any of the segments, including inclusion of insertion attachment(s) in routes between any of the segments. In some embodiments, the user may be able to add and remove attachments prior to or after deployment to the network (e.g., by generation of route tables at [2]). Network function groups may be system-managed, which may mean that a user may not have insight or control over attachments in network function groups after deployment.

After configuration of the network policy, an updated network may be deployed at least by generation of route tables at [2]. As discussed above, with reference to FIG. 1 and FIG. 3B, route tables may be generated by the dynamic insertion management system 402. Illustratively, a route generator (e.g., route generator 116 of FIG. 1) may be used to generate route tables in compliance with the network policy. The route generator 116 may generate route tables after creation of an network function group. In some embodiments, the route generator 116 may generate route tables with each update of the network policy. In some embodiments, the route generator 116, may modify existing route tables to compliant with the network policy, as described above with respect to FIG. 1 and FIG. 3C.

After generation of the route tables, the dynamic insertion management system 402 may deploy the network by deploying the route tables to the core network 406 at [3]. To deploy the network, also referred to herein as executing of the network policy, the dynamic insertion management system 402 may deploy generated route tables compliant with the network policy to core network 406. As an example, the dynamic insertion management system 402 may transmit generated route tables compliant with the network policy to core network 406. Core network 406 may store these route tables in memory and access then memory when routing data. For example, the core network 406 may call a service to determine how the data should be routed at each node in a route. Additionally, or alternatively, each segment in core network 406 may correspond to a memory location. The memory location may be allocated to store a route table for the segment. The dynamic insertion management system 402 may access the memory location for each segment and store the route table generated at [2] for each segment. Additionally, or alternatively, the dynamic insertion management system 402 may access the memory location for each segment and an modify existing route table at each memory location to comply with the network policy. Routing of data in compliance with the route tables will be discussed in more detail at [4]-[6]

At [4], attachments 404 may send data to core network 406. Attachments 404 may include, but are not limited to, virtual private clouds (VPCs) and virtual private networks (VPNs). Each attachment may be connected to a segment. With reference to the illustrative embodiment of FIG. 3C, a first attachment 370 may be coupled to a first segment 360 through a connector 368 as an attachment. Second attachment 372 may be coupled to a second segment 362 through a connector 368. Each attachment may also be associated with a region. With reference to the illustrative embodiment of FIG. 3A, development attachment(s) 318A may be in a first region 304 and coupled to a development segment 310. Development attachment(s) 318B may be in a second region 306 and coupled to a development segment 310. Development attachment(s) 318C may be in a third region 308 and coupled to a development segment 310. In other words, development segment 310 may communicate with attachments in three different regions. As another example, production segment 312 may communicate with attachments in three regions. Illustratively, production attachment(s) 320A may be in a first region 304 and coupled to a production segment 312. Production attachment(s) 320B may be in a second region 306 and coupled to a production segment 312, production attachment(s) 320C may be in a third region 308 and coupled to a production segment 312.

Data transmitted by attachments, such as first attachment 370 may flow directly to the segment to which they are coupled. For example, first segment 408 may be substantially similar to first segment 360 of FIG. 3C. With reference to FIG. 3C, data from first attachment 370 may flow directly to first segment 360 through connector 368, where the connector represents an isolated communication pipeline. As another example, data transmitted by second attachment 372 may flow directly to second segment 362 through connector 369, where the connector 369 represents an isolated communication pipeline.

For example, a user may specify with a user device (e.g., user device(s) 110 of FIG. 1) in the network policy a link between a segment and attachment. Illustratively, a user may specify through the user device that a segment ID is linked to specified attachment IDs. Of course, a user may specify through the user device that a specified attachment IDs are linked to a segment ID. Accordingly, in some embodiments, the route may use attachment IDs in segment route tables because an isolated communication pipeline exists between the segment and attachment to route the data without reliance on the route table.

The isolated communication pipeline may be generated by a dynamic insertion management system (e.g., dynamic insertion management system 106 of FIG. 1) based on the network policy. Additionally, or alternatively, the isolated communication pipeline may be generated by a network (e.g., network 120, SD-WAN 300, SD-WAN 350, etc.) based on data provided to the network by dynamic insertion management system 106 during deployment of the network. Illustratively, dynamic insertion management system 106 may provide instructions to generate an isolated communication pipeline between first attachment 370 and first segment 360. Of course, dynamic insertion management system 106 may simply indicate that 370 is defined as an attachment of first segment 360, and the network, or a component thereof, may generate the pipeline based on this indication.

At [5], data received by the first segment 408 from attachments 404 may be routed in accordance with the route table of the first segment 408. The data may be received from a subset of the attachments 404. With reference to the illustrative embodiment of FIG. 3C, The network 300 may include first attachment 370 and second attachment 372. Data from first attachment 370 may flow directly to first segment 360 through connector 368. However, data from first attachment 370 may not flow directly to second segment 362 because there is no connector between the first attachment 370 and the second segment 362.

After receipt of data by the first segment 408 at [4], the core network 406 may route the data in accordance with one or more routes specified in the first segment route. Illustratively, a route may include a series of nodes with each node representing a component (e.g., a virtual private cloud or VPC). Each node may be associated with a route table, where the route table includes a destination for data from any given source. With reference to the illustrative example of FIG. 3C route table 386 of first segment 360 may include a destination of the insertion attachment 374 for data received from the first attachment 370.

When data from the first attachment 370 reaches the first segment 360, the core network 352 may call a routing service, which accesses the route table 386 for the first segment 360. From the route table 386, the routing service may extract the destination of insertion attachment 374 for data received from the first attachment 370. By way of illustration the routing service may extract the destination of "insert-attach" from route table 386 and correlate this with insertion attachment 374. For example, the routing service may access a lookup table for identifiers, which may be maintained by core network 352. The routing service may provide this data to the core network 352 which routes the data to the destination of insertion attachment 374. To reach the insertion attachment 374, the data may need to pass through network function group 364.

Returning to FIG. 4 at [5], a route table for first segment 408 may specify that data from attachments 404 or a subset of attachments 404 should be routed to insertion attachments 414. To reach insertion attachment(s) 414, the core network 406 may first route the data to network function group 412. From network function group 412, the core network 406 may route the data to insertion attachment(s) 414 at [6]. Illustratively, the core network 406 may route the data through a core network edge (CNE). The Core network edge (CNE) may act as a regional connection point for the core network 406. The CNEs can have single or multiple network segments that act as isolated routing domains and support network isolation as well as concurrent and/or overlapping in time access by multiple users. The insertion attachment(s) 414 may be configured to process the data to determine whether it can proceed to subsequent destinations.

Illustratively, insertion attachment(s) 414 may include one or more security components. By way of example, insertion attachment(s) 414 may include, but is not limited to, a firewall or an address authenticator (e.g., a network address authenticator). Insertion attachment(s) 414 may be configured to process data received from the core network 406. For example, data from first segment 408 may be routed to network function group 412 and proceed to insertion attachments 414. Insertion attachment(s) 414 may include a network address authenticator. The network address authenticator may determine whether the source of the data (e.g., attachments 404) has a valid network address. If the network address authenticator determines that source of data (e.g., attachments 404) does not have a valid network address, the IP authenticator may stop the data from travelling further down the route specified in the route tables generated at [2]. As another example, insertion attachment(s) 414 may include a firewall specified to screen for a specified type of malware. The firewall may process data received by insertion attachment(s) 414 (e.g., from network function group 412) and determine whether the specified type of malware is present. If the firewall determines that the specified type of malware is present, the firewall may stop the data from travelling further down the route specified in the route tables generated at [2].

If the insertion attachment(s) 414 determine that the data should proceed further along the route, the core network 406 may route the data from the insertion attachment(s) 414 back to network function group 412 at [7]. Insertion attachment(s) 414 may then transmit the data back to the network function group 412.

With reference to the illustrative example of FIG. 3C, after reaching the network function group 364, the data may flow to insertion attachment 374 through connector 376. Passage of data through connector 376 may be managed by a CNE 377. The insertion attachment 374 may be a firewall, and process received data to verify whether specified types of malware are present. If the insertion attachment 374 determines that the specified type of malware is present, the firewall may stop the data from travelling further down the route. Illustratively, insertion attachment 374 may not transmit the data back to 364 through connector 376. In some embodiments, insertion attachment 374 may transmit a notification that the data contains malware back to network function group 364, and the network function group 364 may determine not to allow the data to proceed to the next destination. Illustratively, if data from the first attachment 370 is processed by insertion attachment 374 and determined to contain malware, the network function group 364 may prevent the data from reaching second attachment 372 as specified in route table 390. Additionally, or alternatively, insertion attachment 374 may transmit a notification back to core network 352 that the data contains malware and the core network 352.

As another example, and with continued reference to the illustrative example of FIG. 3C, after reaching the network function group 364, the data may flow to insertion attachment 374 through connector 376. Passage of data through connector 376 may be managed by a CNE 377. The insertion attachment 374 may be a network address authenticator, and process received data to verify whether the network address associated with the source of the data (e.g., first attachment 370) is within a range of allowed network addresses. If the insertion attachment 374 determines network address associated with the source of the data (e.g., first attachment 370), the insertion attachment 374 may stop the data from travelling further down the route. that the Embodiments with more than one insertion attachment will be discussed in more detail in FIG. 5.

Returning to FIG. 4, if insertion attachment(s) 414 or network function group 412 determine that the data should proceed along the route specified by the route tables, the core network 406 may route data from network function group 412 to second segment 410 at [8]. By way of example, the network function group 412 may include a route table. The route table may indicate that after processing by insertion attachments 414, data from source attachments of attachments 404 coupled to first segment 408, should be transmitted to second segment 410. Accordingly, core network 406 may route the data to second segment 410 at [8].

Returning to the illustrative example of FIG. 3C, the core network 352 may again call the routing service to extract the next destination for the data from route table 390 of network function group 364. The routing service may determine that the next destination for data from the first attachment 370 is the second attachment 372. Illustratively, the routing service may extract data from routing table 390 indicating that data from "first-attach-address" has a subsequent destination of "second-attach" The routing service may correlate "first-attach-address" with first attachment 370 and "second-attach" with second segment 362. The core network 352 may then route the data to the second attachment 372. This may continue until a final destination is reached. By way of illustration, when a final destination is reached, the route table for the final destination may no longer contain a next destination for the data. With continued reference to FIG. 3C, second segment route table 388 may not include a destination for data received from the source of first attachment 370. Additionally, or alternatively, the second segment route table 388 may not include a destination for data received from the insertion attachment 374. Of course, in some embodiments, transmitted data packets may contain header information including both a source component, intermediate components, and destination components in a specified route.

While the examples provided above reference data from source attachments coupled to first segment 408 traveling through Insertion attachment(s) 414 to reach second segment 410, this is not meant to be limiting. In some embodiments, data from source attachments coupled to second segment 410 may travel through Insertion attachment(s) 414 to reach first segment 408.

With reference to the illustrative embodiment of FIG. 3C, data from second attachment 372 may flow through connector 369 to second segment 362. Illustratively, data from second attachment 372 may be transmitted to second segment 362 through connector 369. Second segment 362 may include a route table 388 which specifies that data from second attachment 372 should proceed to insertion attachment 374. By way of illustration, route table 388 includes a specification of an identifier "Second-Attach." Core network 406 may extract this information (e.g., through a routing service) and correlate it with second attachment 372 through a lookup table. The lookup table may be derived from attachment route tables such as route table 382 of second attachment 372. The route table 388 may also include a specification of a destination as "Insert-Attach," which core network 406 may extract and correlate with insertion attachment 374. Accordingly, core network 406 may route the data to network function group 364 which connects to insertion attachment 374 through connector 376.

From network function group 364 the data may be routed to insertion attachment 374 through connector 376. The routing between network function group 364 and insertion attachment 374 may be managed by a core network edge (CNE) 377. Illustratively, CNE 377 may isolate data transmitted through connector 376 such that communications within a first region (e.g., first region 304 of FIGS. 3A-3B) are isolated from communications of a second region (e.g., second region 306 of FIGS. 3A-3B). The insertion attachment 374 may analyze the data to determine whether it can proceed back to network function group 364. Illustratively, insertion attachment 374 may be a firewall that screens out specified types of malware. If insertion attachment 374 determines that the data is acceptable (e.g., does not contain malware) the data may proceed back through connector 376 to network function group 364. The communication of data back through network function group 364 may also be managed by CNE 377.

Based on route table 390 of network function group 364, the data may be routed to first segment 360. For example, core network 406 may extract that data from second attachment 372 should be routed to first segment 360 after processing by insertion attachment 374. Route table 390 may include a specification of an identifier "Second-Attach." Core network 406 may extract this information (e.g., through a routing service) and correlate it with second attachment 372 through a lookup table. The route table 390 may also include a specification of a destination as "First-Attach," which core network 406 may extract and correlate with first attachment 370. Accordingly, core network 406 may route the data to first segment 360, and from first segment 360 the data may travel to first attachment 370 through connector 368.

While the above examples describe generation of routes between components attached to a core network, such as core network 406 of FIG. 4, this is not intended to be limiting. Policy data may specify that data from an attachment within a core network, such as core network 406, should be routed through a network appliance outside the core network prior to reaching its final destination, which may be internal or external to the core network. With reference to FIG. 1, policy data may specify that an attachment to a segment within cloud provider network 101 should be routed to an external network appliance, such as virtual private clouds 170 through network 120.

FIG. 5 is a flowchart of an example routine 500 for dynamic insertion of intermediate network components in cross region routes. The routine 500 begins at block 502. In some embodiments, the routine 500 may be carried out by a dynamic insertion management system (e.g., dynamic insertion management system 106 of FIG. 1, dynamic insertion management system 402 of FIG. 4, etc.) Additionally, or alternatively, the routine 500 may be executed in a network (e.g., network 120 of FIG. 1, SD-WAN 300 of FIGS. 3A-3B, SD-WAN 350 of FIG. 3C, etc.) by a core network (e.g., core network 302 of FIGS. 3A-3B, core network 352 of FIG. 3C, or core network 406 of FIG. 4). The network may include two regions. The network may also have more than two regions, such as SD-WAN 300 depicted in FIGS. 3A-3B.

Block 504, Block 506, and Block 508 may define starting points based on an initial configuration of a network (e.g., SD-WAN 300 of FIGS. 3A-3B). For example, the routine 500 may proceed to block 504 when the network (e.g., SD-WAN 300 of FIGS. 3A-3B) has an insertion attachment in one region. Illustratively, a user may specify the initial configuration in the policy data for the network through a user device (e.g., device(s) 110 of FIG. 1).

For example, with reference to the illustrative example of FIG. 3A, a user may specify, through a user device, in the policy data an initial configuration for the core network 302. The initial configuration may include a first region 304, a second region 306, and a third region 308. The initial configuration may further include that there should be a development segment 310 coupled to development attachment(s) 318A of first region 304, development attachment(s) 318B of second region 306, and development attachment(s) 318C of third region 308. In addition, the initial configuration may include that there should be a production segment 312 coupled to production attachment(s) 320A of first region 304, production attachment(s) 320B of second region 306, and production attachment(s) 320C of third region 308. The initial configuration may further include that there should be at least one of insertion attachments 316 coupled to at least one of network function group(s) 314. For example, as one non-limiting example, the initial configuration may specify that there should be an insertion attachment 316A coupled to a network function group 314 in first region 304, where the insertion attachment 316A may be the only insertion attachment of SD-WAN 300. With reference to FIG. 3B, the initial configuration may specify that there should be an insertion attachment 316A coupled to an insertion segment 315A in first region 304, where the insertion attachment 316A may be the only insertion attachment of SD-WAN 300. In other words, only first region 304 may have an insertion attachment (e.g., insertion attachments 316 of FIGS. 3A-3B). Second region 306 and third region 308 may not have insertion attachments (e.g., insertion attachments 316 of FIGS. 3A-3B).

While the above example references embodiments where only first region 304 had an insertion attachment (e.g., insertion attachment 316A of FIGS. 3A-3B), this is not intended to be limiting. For example, in some embodiments, only second region 306 may have an insertion attachment (e.g., insertion attachment 316B of FIGS. 3A-3B). In other embodiments, only third region 308 may have an insertion attachment (e.g., insertion attachment 316C of FIGS. 3A-3B). Returning to FIG. 5 at block 504, in a network (e.g., SD-WAN 300 of FIGS. 3A-3B) where an insertion attachment (e.g., insertion attachments 316 of FIGS. 3A-3B) is accessible in only one region, the routine 500 may proceed to block 510.

At block 510, a dynamic insertion management system (e.g., dynamic insertion management system 402 of FIG. 4) may use the region containing the insertion attachment (e.g., insertion attachments 316 of FIGS. 3A-3B) to generate route tables to route data across regions. Additionally, or alternatively, a core network (e.g., core network 406) may use the region containing the insertion attachment (e.g., insertion attachments 316 of FIGS. 3A-3B) to route data across regions. Illustratively, the core network (e.g., core network 406 of FIG. 4) may call a routing service to analyze route tables generated by dynamic insertion management system (e.g., dynamic insertion management system 402 of FIG. 4). Based on the analysis and data acquired from the network regarding the network components, such as whether components are malfunctioning, the routing service may route the data through an accessible insertion attachment.

With continued reference to the illustrative embodiment of FIGS. 3A-3B, the dynamic insertion management system 402 may have access to a network policy indicating that data from development attachment(s) 318A should be routed to an insertion attachment in at least one of first region 304, second region 306, or third region 308 prior to reaching production attachment(s) 320A. The policy data may also include that insertion attachment 316A is the only accessible insertion attachment in SD-WAN 300. For example, insertion attachment 316A may be the only insertion attachment specified in the network policy for SD-WAN 300. Based on this network policy, the dynamic insertion management system 402 may generate routes through insertion attachment 316A.

Additionally, or alternatively, insertion attachments 316A, 316B, and 316C may all be specified. However, insertion attachment 316B and insertion attachment 316C may be malfunctioning. Based on the network policy a dynamic insertion management system (e.g., dynamic insertion management system 402 of FIG. 4) generate route tables including potential routes through one or more of insertion attachment 316A, insertion attachment 316B, or insertion attachment 316C. After deployment, a core network (e.g., core network 406 of FIG. 4) may determine that only insertion attachment 316A is accessible. For example, the core network (e.g., core network 406 of FIG. 4) may determine insertion attachment 316B and insertion attachment 316C may be malfunctioning. Additionally, or alternatively, the core network (e.g., core network 406 of FIG. 4) may determine that insertion attachment 316B and insertion attachment 316C are busy (e.g., processing other data). Of course, the core network (e.g., core network 406 of FIG. 4) may determine that one of insertion attachment 316B and insertion attachment 316C are busy, and the other is malfunctioning. The core network (e.g., core network 406 of FIG. 4) may accordingly select routes through insertion attachment 316A from the potential routes specified in the route table generated by dynamic insertion management system (e.g., dynamic insertion management system 402 of FIG. 4).

As another example, in a non-limiting embodiment, insertion attachment 316B may be the only insertion attachment specified in SD-WAN 300. Dynamic insertion management system 402 may generate route tables that route data from development attachment(s) 318A in first region 304 to insertion attachment 316B in second region 306 prior to reaching production attachments 320 in first region 304. Core network 406 may implement these route tables in routing data between attachments and segments as discussed above with respect to FIG. 4.

Returning to FIG. 5 at block 506, in a network (e.g., SD-WAN 300 of FIGS. 3A-3B) where an insertion attachment (e.g., insertion attachments 316 of FIGS. 3A-3B) is available in two regions, the routine 500 may proceed to block 512. At block 512, a dynamic insertion management system (e.g., dynamic insertion management system 402 of FIG. 4) may determine whether there is a specified region set in the network policy. If there is a specified region set, the dynamic insertion management system 402 may choose an network function group in the specified region at block 514. Illustratively, the network policy may specify that insertion attachment 316A and insertion attachment 316B should be coupled to network function group 314. As another example, with reference to FIG. 3B, the network policy may specify that insertion attachment 316A should be coupled to insertion segment 315A of first region 304 and insertion attachment 316B should be coupled to insertion segment 315B of second region 306. The network policy may further specify that first region 304 is the specified region. Accordingly, the dynamic insertion management system (e.g., dynamic insertion management system 402 of FIG. 4) may generate route tables including routes through insertion attachment 316A instead of insertion attachment 316B.

Additionally, or alternatively, dynamic insertion management system (e.g., dynamic insertion management system 402 of FIG. 4) may generate route tables with potential routes through both insertion attachment 316A and insertion attachment 316B. After deployment, a core network (e.g., SD-WAN core network 302 of FIGS. 3A-3B, core network 406 of FIG. 4, etc.) may determine to route data through insertion attachment 316A based on the route tables and on the definition of first region 304 as the specified region in the network policy.

For example, with continued reference to the illustrative example of FIG. 3A, the network policy may specify that data from development attachment(s) 318A should be routed to an insertion attachment of insertion attachments 316 prior to reaching production attachment(s) 320A. The network policy may further specify that a preference to use an insertion attachment in a particular region to route data. For example, the network policy may specify the user of insertion attachment 316A in first region 304 as preferred In a non-limiting embodiment, insertion attachment 316A and insertion attachment 316B may be present in SD-WAN 300. Dynamic insertion management system 402 may generate route tables that route data from development attachment(s) 318A in first region 304 to insertion attachment 316A in first region 304 prior to reaching production attachments 320 in first region 304.

If there a specified region is not set, the dynamic insertion management system (e.g., dynamic insertion management system 402 of FIG. 4) may determine an insertion attachment from accessible insertion attachments at block 516. Additionally, or alternatively, a core network (e.g., core network 406 of FIG. 4) may determine an insertion attachment from accessible insertion attachments at block 516. For example, with continued reference to the illustrative examples of FIG. 3A, the network policy may specify that data from development attachment(s) 318A should be routed to an insertion attachment of insertion attachments 316 prior to reaching production attachment(s) 320A. In further embodiments, the network policy may not include a specified region to route data.

In a non-limiting embodiment, insertion attachment 316A and insertion attachment 316B may be present in SD-WAN 300. Illustratively, insertion attachment 316A and insertion attachment 316B may both be specified as attachments in the network policy. The network policy may further specify a priority for each insertion attachment, where the insertion attachment with higher priority is used, if accessible. Priority may be defined in the network policy through a list with higher priority attachments listed earlier in the list. In some embodiments, a user may configure the network policy through a user device to include a prioritized order for edge locations (e.g., CNEs 328 of FIGS. 3A-3B) to use for service insertion within the network function group. If the connectivity between a pair of edge locations for a segment and network function group becomes impaired, the attachments may no longer be accessible because they can no longer reach each other through the original network function group edge location. Accordingly, the routes including a connection between these attachments may be withdrawn from the network function group route table. The route tables may be updated in accordance with the prioritized order such that routes using the next highest priority attachment that is accessible is used in routing data between attachments.

With continued reference to the illustrative example, the network policy may specify that insert attachment 316A is higher priority than insert attachment 316B. Dynamic insertion management system 402 may accordingly generate route tables using insert attachment 316A, if insert attachment 316A is available. In some embodiments, dynamic insertion management system 402 may generate route tables with routes that use either insert attachment 316A or insert attachment 316B. Dynamic insertion management system 402 may further indicate within the route tables that routes generated including insert attachment 316A are preferred where insert attachment 316A is accessible. Insert attachment 316A may be accessible in situations including, but not limited to, when insert attachment 316A is present in the network and when insert attachment 316A is not routing other data.

Additionally, or alternatively, dynamic insertion management system 402 may generate route tables that randomly select insertion attachment 316B for the insertion attachment in routes between development attachment(s) 318A in first region 304 and production attachments 320A in first region 304. Of course, dynamic insertion management system 402 may generate route tables that randomly select 316A for the insertion attachment in routes between development attachment(s) 318A in first region 304 and production attachments 320A in first region 304.

Additionally, or alternatively, dynamic insertion management system 402 may generate route tables including potential routes with either or both of insertion attachment 316A and insertion attachment 316B. A core network (e.g., core network 302 of FIG. 3A, core network 406 of FIG. 4, etc.) may randomly select routes from the potential routes where no specified region is present in the network policy. Illustratively, the core network (e.g., core network 302 of FIG. 3A, core network 406 of FIG. 4, etc.) may select routes through insertion attachment 316A, routes through insertion attachment 316B, or some combination thereof.

Returning to FIG. 5 at block 508, in a network (e.g., SD-WAN 300 of FIG. 3A) where an insertion attachment (e.g., insertion attachments 316 of FIG. 3A) may not exist in specified regions, the routine 500 may proceed to block 518. At block 518, a dynamic insertion management system (e.g., dynamic insertion management system 402 of FIG. 4) may determine whether there is a fallback region specified in the network policy. The fallback region may specify a region to route traffic when specified insertion attachments are not available.

With continued reference to FIG. 3A, a network policy may specify that data from development attachment(s) 318A should be routed through one of insertion attachment 316A of first region 304 or insertion attachment 316B of second region 306 prior to reaching production attachment(s) 320A. In a non-limiting aspect, neither insertion attachment 316A nor insertion attachment 316B may be available. Illustratively, they may be processing data received from other sources. Of course, in some embodiments, insertion attachment 316A and insertion attachment 316B may not exist. For example, the network policy may be out of date and insertion attachment 316A and insertion attachment 316B may have been removed from the network. If the user has specified a fallback region in the network policy, the network may instead route the data to the fallback region. For example, a user may specify third region 308 as the fallback region in the network policy. In further embodiments, dynamic insertion management system 402 may generate route tables to route data from development attachment(s) 318A to third region 308 prior to production attachment(s) 320A. Illustratively, dynamic insertion management system 402 may generate route tables to route data from development attachment(s) 318A to production attachment(s) 320A. If no fallback region is specified, core network 406 may not route the data to its intended destination.

In a non-limiting example, to define a fallback region, a user may specify a fallback region in the network policy as pointing to the a first region as the fallback region if attachments of a first network function group are not accessible. For example, an attachment may be inaccessible for reasons including, but not limited to, non-existence of the attachment, malfunction or failure of the attachment, the attachment is processing other data. In further embodiments, the network function group routing behavior defined in the policy may need to be overwritten for dynamic insertion management system (e.g., dynamic insertion management system 402 of FIG. 4) or core network 406 (e.g., core network 406 of FIG. 4) to use a fallback region. With reference to the non-limiting example, a user may specify through a user device (e.g., user device(s) 110 of FIG. 1) selection of the first region with an additional approval to allow data to be routed when insertion attachments of a first network function group are not present. Illustratively, the user through a user device (e.g., user device(s) 110 of FIG. 1) may add a criteria to the network policy to override routing to the first network function group. The dynamic insertion management system (e.g., dynamic insertion management system 402 of FIG. 4) or core network (e.g., core network 406 of FIG. 4) may interpret this criteria to provide instruction or allow for data to be routed to the fallback edge if no attachment within the first network function group is accessible.

As another non-limiting example, to define a fallback region, a user may specify a fallback region in the network policy as pointing to a first region as the fallback region if attachments of a first insertion segment are not accessible. For example, an attachment may be inaccessible for reasons including, but not limited to, non-existence of the attachment, malfunction or failure of the attachment, the attachment is processing other data. In further embodiments, the insertion segment routing behavior defined in the policy may need to be overwritten for dynamic insertion management system (e.g., dynamic insertion management system 402 of FIG. 4) or core network 406 (e.g., core network 406 of FIG. 4) to use a fallback region. With reference to the non-limiting example, a user may specify through a user device (e.g., user device(s) 110 of FIG. 1) selection of the first region with an additional approval to allow data to be routed when insertion attachments of a first insertion segment are not present. Illustratively, the user through a user device (e.g., user device(s) 110 of FIG. 1) may add a criteria to the network policy to override routing to the first insertion segment. The dynamic insertion management system (e.g., dynamic insertion management system 402 of FIG. 4) or core network (e.g., core network 406 of FIG. 4) may interpret this criteria to provide instruction or allow for data to be routed to the fallback edge if no attachment within the first insertion segment is accessible.

While the description of the example routine 500 above refers to the illustrative example of FIG. 3A, this is not intended to be limiting. The example routine 500 may also be applied to different networks, such as the example software-defined wide area network of FIG. 3B.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a cloud provider network comprising a plurality of compute components and a plurality of gateway components, wherein the plurality of gateway components are configured to route network traffic between the plurality of compute components;
a dynamic insertion management system configured to generate, based on policy data originating from a user device regarding a wide area network to be deployed on the cloud provider network and transient metadata regarding a current state of the wide area network, a first route table for a first segment, the first route table specifying a first potential route from a first virtual private cloud in a first region of the wide area network through a first network appliance in the first region and a second potential route from the first virtual private cloud in the first region through a second network appliance in a second region of the wide area network, wherein the policy data comprises:
an identification of the first virtual private cloud as being an attachment of the first segment, wherein the first segment is a user-managed segment, and wherein the first virtual private cloud is in the first region of the wide area network,
an identification of the first network appliance as being an attachment of a network function group, wherein the network function group is a system-managed group, and wherein the first network appliance is in the first region of the wide area network,
an identification of the second network appliance as being an attachment of the network function group, wherein the second network appliance is in the second region of the wide area network,
an identification that the data from the first virtual private cloud is to be routed through at least one of the first network appliance or the second network appliance, and
an identification of the first region as being a first specified region for routing data from the first virtual private cloud; and
one or more computing devices programmed by executable instructions to at least:
obtain the first route table generated by the dynamic insertion management system;
receive data from the first virtual private cloud;
select, based on the first specified region, the first potential route from the first route table; and
transmit the data from the first virtual private cloud through the first network appliance in the first region according to the selected first potential route.

2. The system of claim 1, wherein the policy data further comprises an identification of a second virtual private cloud as being an attachment of a second segment, wherein the second segment is a user managed segment in the second region of the wide area network.

3. The system of claim 2,
wherein the dynamic insertion management system is further configured to generate, based on the policy data and the transient metadata, at least a second route table for the network function group, wherein the second route table specifies that data from the first virtual private cloud in the first region is to be routed to the second virtual private cloud in the second region after going through the first network appliance in the first region;
wherein the policy data further comprises an identification that data from the first virtual private cloud is to be routed through at least one of the first network appliance or the second network appliance prior to reaching the second virtual private cloud, and
wherein the one or more computing devices are further programmed by executable instructions to at least:
obtain the second route table for the network function group;
select, based on the policy data, the route from the second route table; and
transmit the data from the first virtual private cloud to the second virtual private cloud in the second region through the first network appliance in the first region according to the selected route.

4. The system of claim 2,
wherein the dynamic insertion management system is further configured to generate, based on the policy data and the transient metadata, at least a second route table for the network function group, wherein the second route table specifies that data from the first virtual private cloud in the first region is to be routed to the second virtual private cloud in the second region after going through the second network appliance in the second region;

wherein the policy data further comprises an identification that data from the first virtual private cloud is to be routed through at least one of the first network appliance or the second network appliance prior to reaching the second virtual private cloud, and wherein the one or more computing devices are further programmed by executable instructions to at least:

obtain the second route table for the network function group;

select, based on the policy data, the route from the second route table; and transmit the data from the first virtual private cloud to the second virtual private cloud in the second region through the second network appliance in the second region according to the selected route.

5. The system of claim 2, wherein the dynamic insertion management system is further configured to generate, based on the policy data and the transient metadata, a second route table for the second segment, wherein the second route table includes a third potential route from the second virtual private cloud in the second region to the first network appliance in the first region and a fourth potential route from the second virtual private cloud in the second region to the second network appliance in the second region;

wherein the policy data further comprises an identification that data from the second virtual private cloud is to be routed through at least one of the first network appliance or the second network appliance, and wherein the one or more computing devices are further programmed by executable instructions to at least:

obtain the second route table for the second segment;

determine, based on the policy data, to randomly select the third potential route to route data from the second virtual private cloud to the first network appliance; and transmit the data according to the selected third potential route.

6. The system of claim 2, wherein the dynamic insertion management system is further configured to generate, based on the policy data and the transient metadata, a second route table for the second segment, wherein the second route table includes a third potential route from the second virtual private cloud in the second region to the first network appliance in the first region and a fourth potential route from the second virtual private cloud in the second region to the second network appliance in the second region;

wherein the policy data further comprises an identification that data from the second virtual private cloud is to be routed through at least one of the first network appliance or the second network appliance, and wherein the one or more computing devices are further programmed by executable instructions to at least:

obtain the second route table for the second segment;

determine, based on the policy data, to randomly select the fourth potential route to route data from the second virtual private cloud to the second network appliance; and transmit the data according to the selected fourth potential route.

7. The system of claim 2, wherein the dynamic insertion management system is further configured to generate, based on the policy data and the transient metadata, a second route table for the network function group, wherein the second route table includes a third potential route from the second virtual private cloud in the second region to the first network appliance in the first region and a fourth potential route from the second virtual private cloud in the second region to the second network appliance in the second region;

wherein the policy data further comprises:

an identification that data from the second virtual private cloud is to be routed through at least one of the first network appliance or the second network appliance, and an indication of the second region as being a second specified region for routing data from the second virtual private cloud; and wherein the one or more computing devices are further programmed by executable instructions to at least:

obtain the second route table for the network function group;

determine, based on the second specified region, to select the fourth potential route to route data from the second virtual private cloud to the second network appliance; and transmit the data according to the selected fourth potential route.

8. A non-transitory, computer-readable medium comprising computer-executable instructions for dynamic insertion of network components, wherein the computer-executable instructions, when executed by a computer system, cause the computer system to:

in response to reception of policy data from a user device, the policy data regarding a wide area network to be deployed on a cloud provider network, generate, based on the policy data regarding a wide area network to be deployed on the cloud provider network and transient metadata regarding a current state of the wide area network, a first route table for a first segment, wherein the first route table specifies a first potential route from a first component in a first region of the wide area network through a second component in the first region and a second potential route from the first component in the first region through a third component in a second region of the wide area network, wherein the policy data comprises:

an identification of the first component as being an attachment of the first segment, wherein the first segment is a user-managed segment in the first region of the wide area network, an identification of the second component as being an attachment of a network function group, wherein the network function group is a system-managed group, and wherein the second component is in the first region of the wide area network, an identification of the third component as being an attachment of the network function group, and wherein the third component is in the second region of the wide area network, an identification that the data from the first component is to be routed through at least one of the second component or the third component, and an identification of the first region as being a first specified region for routing data from the first component;

receive data from the first component;

obtain the first route table;

select, based on the first specified region, the first potential route from the first route table; and transmit the data from the first component through the second component in the first region according to the selected first potential route.

9. The non-transitory, computer-readable medium of claim 8, wherein the computer-executable instructions, when executed, further cause the computer system to access policy data comprising an identification of a fourth component as being an attachment of a second segment, wherein the second segment is a user managed segment in the second region of the wide area network.

10. The non-transitory, computer-readable medium of claim 9, wherein the computer-executable instructions, when executed, further cause the computer system to:

in response to reception of policy data from a user device, the policy data regarding a wide area network to be deployed on the cloud provider network, generate, based on the policy data regarding a wide area network to be deployed on the cloud provider network and the transient metadata regarding a current state of the wide area network, a second route table for the network function group, wherein the second route table specifies that data from the first component in the first region is to be routed to the fourth component in the second region after going through the second component in the first region, the policy data comprising an identification that data from the first component is to be routed through at least one of the second component or the third component prior to reaching the fourth component;

obtain the second route table;

select, based on the policy data, the route from the second route table; and transmit the data from the first component to the fourth component in the second region through the second component in the first region according to the selected route.

11. The non-transitory, computer-readable medium of claim 9, wherein the computer-executable instructions, when executed, further cause the computer system to:

in response to reception of policy data from a user device, the policy data regarding a wide area network to be deployed on the cloud provider network, generate, based on the policy data regarding a wide area network to be deployed on the cloud provider network and the transient metadata regarding a current state of the wide area network, a second route table for the network function group, wherein the second route table specifies that data from the first component in the first region is to be routed to the fourth component in the second region after going through the third component in the second region, the policy data comprising an identification that data from the first component is to be routed through at least one of the second component or the third component prior to reaching the fourth component;

obtain the second route table for the network function group;

select, based on the policy data, the route from the second route table; and transmit the data from the first component to the fourth component in the second region through the third component in the second region according to the selected route.

12. The non-transitory, computer-readable medium of claim 9, wherein the computer-executable instructions, when executed, further cause the computer system to:

in response to reception of policy data from a user device, the policy data regarding a wide area network to be deployed on the cloud provider network, generate, based on the policy data regarding a wide area network to be deployed on the cloud provider network and the transient metadata regarding a current state of the wide area network, a second route table for the second segment, wherein the second route table includes a third potential route from the fourth component in the second region to the second component in the first region and a fourth potential route from the fourth component in the second region to the third component in the second region, the policy data comprising an identification that data from the fourth component is to be routed through at least one of the second component or the third component;

obtain the second route table for the second segment;

determine, based on the policy data, to select the third potential route to route data from the fourth component to the second component; and transmit the data according to the selected third potential route.

13. The non-transitory, computer-readable medium of claim 9, wherein the computer-executable instructions, when executed, further cause the computer system to:

in response to reception of policy data from a user device, the policy data regarding a wide area network to be deployed on the cloud provider network, generate, based on the policy data regarding a wide area network to be deployed on the cloud provider network and the transient metadata regarding a current state of the wide area network, a second route table for the second segment, wherein the second route table includes a third potential route from the fourth component to the second component and a fourth potential route from the fourth component to the third component, the policy data comprising an identification that data from the fourth component is to be routed through at least one of the second component or the third component;

obtain the second route table for the second segment;

determine, based on the policy data, to select the fourth potential route to route data from the fourth component to the third component; and transmit the data according to the selected fourth potential route.

14. The non-transitory, computer-readable medium of claim 9, wherein the computer-executable instructions, when executed, further cause the computer system to:

in response to reception of policy data from a user device, the policy data regarding a wide area network to be deployed on the cloud provider network, generate, based on the policy data regarding a wide area network to be deployed on the cloud provider network and the transient metadata, a second route table for the second segment, wherein the second route table includes a third potential route from the fourth component to the second component and a fourth potential route from the fourth component to the third component, the policy data comprising:

an identification that data from the second segment is to be routed through at least one of the second component or the third component, and an indication of the second region as being a second specified region for routing data from the fourth component;

obtain the second route table for the second segment;

determine, based on the second specified region, to select the fourth potential route to route data from the fourth component to the third component; and transmit the data according to the selected fourth potential route.

15. The non-transitory, computer-readable medium of claim 9, wherein the computer-executable instructions, when executed, further cause the computer system to:

in response to reception of policy data from a user device, the policy data regarding a wide area network to be deployed on the cloud provider network, generate, based on the policy data regarding a wide area network to be deployed on the cloud provider network and the transient metadata, a second route table for the second segment, wherein the second route table includes a third potential route from the fourth component in the second region to the second component in the first region, a fourth potential route from the fourth component in the second region to the third component in the second region, and a fifth potential route from the fourth component in the second region to a fifth component in a third region;

the policy data comprising:

an identification that data from the second segment is to be routed through at least one of the second component or the third component, and an identification of a fallback region as being the third region of the wide area network, where the fallback region is to be used to route data from the fourth component if the second component and the third component are inaccessible;

obtain the second route table for the second segment;

determine, based on the fallback region, to select the fifth potential route to route data from the fourth component to the fifth component; and transmit the data according to the selected fifth potential route.

16. A computer-implemented method comprising:

in response to receiving policy data from a user device, the policy data regarding a wide area network to be deployed on a cloud provider network, generating, based on the policy data regarding a wide area network to be deployed on the cloud provider network and transient metadata regarding a current state of the wide area network, a first route table for a first segment, wherein the first route table specifies a first potential route from a first component in a first region of the wide area network through a second component in the first region of the wide area network;

wherein the policy data comprises:

an identification of the first component as being an attachment of the first segment, wherein the first segment is a user-managed segment in the first region of the wide area network;

an identification of the second component as being an attachment of a network function group, wherein the network function group is a system-managed group, and wherein the second component is in the first region of the wide area network; and an identification that the data from the first component is to be routed through at least one of the first region of the wide area network or a second region of the wide area network;

obtaining the first route table for the first segment;

receiving data from the first component;

determining to select the first potential route to route the data from the first component through the second component; and transmitting the data from the first component through the second component in the first region according to the selected first potential route.

17. The computer-implemented method of claim 16, further comprising:

in response to receiving policy data from a user device, the policy data regarding a wide area network to be deployed on the cloud provider network, generating, based on the policy data regarding a wide area network to be deployed on the cloud provider network and the transient metadata, a second route table for the network function group, wherein the second route table includes a second potential route from a third component in the second region to the second component in the first region, and a third potential route from the third component in the second region to a fourth component in a third region, the policy data comprising:

an identification of the third component as being an attachment of a second segment, wherein the second segment is a user managed segment in the second region of the wide area network;

an identification that data from the second segment is to be routed through the second component; and an identification of a fallback region as being the third region of the wide area network, where the fallback region is to be used to route data from the network function group if the second component is inaccessible;

obtaining the second route table for the network function group;

determining, based on the fallback region, to select the third potential route to route data from third component to the fourth component; and transmitting the data from the third component to the fourth component according to the selected third potential route.

18. The computer-implemented method of claim 16, further comprising:

accessing updated policy data regarding the wide area network from an external computing device;

generating, based on the updated policy data, an updated first route table; and deploying the wide area network in the cloud provider network at least by transmitting the updated first route table to the cloud provider network.

19. The computer-implemented method of claim 18, wherein generating the first route table further comprises:

accessing existing routes at a memory location corresponding to the first segment of the cloud provider network; and adding a first priority flag to the first potential route.

20. The computer-implemented method of claim 19, wherein determining to select the first potential route is based on the first priority flag.

* * * * *